United States Patent
Chiang

(10) Patent No.: US 9,684,734 B2
(45) Date of Patent: Jun. 20, 2017

(54) SERVER SIDE WEB BROWSING AND MULTIPLE LENS SYSTEM, METHODS AND APPARATUS

(75) Inventor: Hiang-Swee Chiang, Elmhurst, NY (US)

(73) Assignee: ZARBAÑA DIGITAL FUND LLC, Wilmington, DE (US)

( * ) Notice: Subject to any disclaimer, the term of this patent is extended or adjusted under 35 U.S.C. 154(b) by 63 days.

(21) Appl. No.: 13/160,356

(22) Filed: Jun. 14, 2011

(65) Prior Publication Data

US 2011/0246570 A1   Oct. 6, 2011

Related U.S. Application Data

(60) Continuation of application No. 11/515,460, filed on Aug. 31, 2006, now Pat. No. 7,996,766, which is a
(Continued)

(51) Int. Cl.
*G06F 17/00*   (2006.01)
*G06F 17/30*   (2006.01)
(Continued)

(52) U.S. Cl.
CPC ...... *G06F 17/30905* (2013.01); *G06F 17/211* (2013.01); *G06F 17/212* (2013.01);
(Continued)

(58) Field of Classification Search
CPC ......... G06F 17/30905; G06F 17/30899; G06F 17/30867; G06F 17/212; G06F 17/211; H04L 67/306
(Continued)

(56) References Cited

U.S. PATENT DOCUMENTS

| 5,801,699 A | 9/1998 | Hocker |
|---|---|---|
| 5,802,515 A | 9/1998 | Adar |

(Continued)

FOREIGN PATENT DOCUMENTS

WO   01/67304 A1   9/2001

OTHER PUBLICATIONS

Turlington, "Sams Teach Yourself Netscape Communicator 4.5 in 24 Hours", 1998; Sams Publishing; pp. 21-23, 36-40, 42-45, 57-58, 77, 86.

(Continued)

*Primary Examiner* — Cesar Paula
*Assistant Examiner* — David Faber
(74) *Attorney, Agent, or Firm* — Schwabe, Williamson & Wyatt

(57) ABSTRACT

A user may access a host server and receive display information within a single browser window. The display information includes at least one lens, wherein each lens controls server side web browsing and allows the user to view a separate web page from the Internet. The host server provides personalized web browsing capability specific to a particular user independent of the browser, device or location of the user. After the user submits a request to view a particular web page, the web page information is retrieved by the host server and transmitted to the user for display within a selected lens. Each lens controls server-side web browsing through independent navigational controls, such as a horizontal and vertical scroll bar, a resize button and the like. One lens may also control the web content displayed in another lens. The host server may reformat entire web pages so that they can be displayed within a lens without the need for scrolling. Additionally, each lens may have multiple cookies associated therewith. Users may further submit bookmarks which are applicable to one or more of the
(Continued)

lenses. Bookmarks may be recognized through initiating a single command.

19 Claims, 21 Drawing Sheets

Related U.S. Application Data division of application No. 09/565,155, filed on May 3, 2000.

(60) Provisional application No. 60/187,434, filed on Mar. 7, 2000.

(51) Int. Cl.
　　*G06F 17/21*　　(2006.01)
　　*H04L 29/08*　　(2006.01)
(52) U.S. Cl.
　　CPC .. *G06F 17/30867* (2013.01); *G06F 17/30899* (2013.01); *H04L 67/306* (2013.01)
(58) Field of Classification Search
　　USPC ....... 715/200, 201, 234, 239, 243, 252, 273, 715/255, 249
　　See application file for complete search history.

(56) References Cited

U.S. PATENT DOCUMENTS

| | | | |
|---|---|---|---|
| 5,805,153 A | 9/1998 | Nielsen | |
| 5,845,299 A | 12/1998 | Arora | |
| 5,875,296 A | 2/1999 | Shi | |
| 5,890,172 A | 3/1999 | Borman | |
| 5,897,644 A | 4/1999 | Nielsen | |
| 5,899,975 A | 5/1999 | Nielsen | |
| 5,911,145 A | 6/1999 | Arora | |
| 5,918,010 A | 6/1999 | Appleman | |
| 5,918,080 A | 6/1999 | Yoshida | |
| 5,918,237 A | 6/1999 | Montalbano | |
| 5,923,326 A | 7/1999 | Bittinger | |
| 5,944,824 A | 8/1999 | He | |
| 5,951,636 A | 9/1999 | Zerber | |
| 5,983,227 A | 11/1999 | Nazem | |
| 5,991,781 A | 11/1999 | Nielsen | |
| 6,003,032 A | 12/1999 | Bunney | |
| 6,003,047 A | 12/1999 | Osmond | |
| 6,006,334 A | 12/1999 | Nguyen | |
| 6,011,537 A | 1/2000 | Slotznick | |
| 6,016,494 A | 1/2000 | Isensee | |
| 6,023,714 A | 2/2000 | Hill | |
| 6,025,844 A | 2/2000 | Parsons | |
| 6,028,603 A | 2/2000 | Wang | |
| 6,031,989 A | 2/2000 | Cordell | |
| 6,035,404 A | 3/2000 | Zhao | |
| 6,041,357 A | 3/2000 | Kunzleman | |
| 6,041,360 A | 3/2000 | Himmel | |
| 6,085,247 A * | 7/2000 | Parsons, Jr. ............ | G06F 9/4443 705/34 |
| 6,092,196 A | 7/2000 | Reiche | |
| 6,115,040 A | 9/2000 | Bladow | |
| 6,119,078 A | 9/2000 | Kobayakawa | |
| 6,141,758 A | 10/2000 | Benantar | |
| 6,144,991 A * | 11/2000 | England ............ | G06F 17/30873 707/E17.111 |
| 6,151,622 A | 11/2000 | Fraenkel | |
| 6,163,778 A | 12/2000 | Fogg | |
| 6,178,443 B1 * | 1/2001 | Lin ........................ | H04L 29/06 707/999.104 |
| 6,178,511 B1 | 1/2001 | Cohen | |
| 6,182,097 B1 | 1/2001 | Hansen | |
| 6,199,071 B1 | 3/2001 | Nielsen | |
| 6,205,480 B1 | 3/2001 | Broadhurst | |
| 6,208,995 B1 | 3/2001 | Himmel | |
| 6,226,752 B1 | 5/2001 | Gupta | |
| 6,233,682 B1 * | 5/2001 | Fritsch ................... | 713/168 |
| 6,266,684 B1 | 7/2001 | Kraus | |
| 6,278,465 B1 | 8/2001 | Nielsen | |
| 6,300,947 B1 | 10/2001 | Kanevsky | |
| 6,310,601 B1 | 10/2001 | Moore | |
| 6,311,180 B1 | 10/2001 | Fogarty | |
| 6,313,854 B1 | 11/2001 | Gibson | |
| 6,339,437 B1 | 1/2002 | Nielsen | |
| 6,374,359 B1 | 4/2002 | Shrader | |
| 6,385,615 B1 * | 5/2002 | Haeri ................ | G06F 17/30876 |
| 6,405,214 B1 | 6/2002 | Meade, II | |
| 6,412,008 B1 | 6/2002 | Fields | |
| 6,438,578 B1 | 8/2002 | Schmid | |
| 6,483,523 B1 * | 11/2002 | Feng ............................ | 715/745 |
| 6,505,230 B1 | 1/2003 | Mohan | |
| 6,509,913 B2 * | 1/2003 | Martin, Jr. ............ | G06F 9/4443 455/566 |
| 6,553,363 B1 * | 4/2003 | Hoffman ........... | G06F 17/30899 |
| 6,564,327 B1 | 5/2003 | Klensin | |
| 6,604,241 B1 * | 8/2003 | Haeri ................ | H04L 29/12066 348/E7.071 |
| 6,605,120 B1 | 8/2003 | Fields | |
| 6,615,212 B1 | 9/2003 | Dutta | |
| 6,615,237 B1 | 9/2003 | Kyne | |
| 6,629,246 B1 | 9/2003 | Gadi | |
| 6,651,168 B1 | 11/2003 | Kao | |
| 6,665,842 B2 | 12/2003 | Nielsen | |
| 6,668,322 B1 | 12/2003 | Wood | |
| 6,734,880 B2 * | 5/2004 | Chang ................... | A61B 6/463 715/730 |
| 6,769,068 B1 | 7/2004 | Brozowski | |
| 6,769,096 B1 | 7/2004 | Kuppusamy | |
| 6,826,592 B1 * | 11/2004 | Philyaw et al. ............... | 709/202 |
| 6,832,355 B1 * | 12/2004 | Duperrouzel et al. ........ | 715/788 |
| 6,857,102 B1 | 2/2005 | Bickmore | |
| 6,868,433 B1 * | 3/2005 | Philyaw ................... | G06F 3/002 235/375 |
| 6,925,595 B1 | 8/2005 | Whitledge | |
| 6,986,060 B1 | 1/2006 | Wong | |
| 7,016,977 B1 | 3/2006 | Dunsmoir | |
| 7,149,982 B1 * | 12/2006 | Duperrouzel ......... | G06F 3/0481 715/778 |
| 7,490,292 B2 | 2/2009 | Hennum | |
| 7,660,868 B1 * | 2/2010 | Kembel ............ | G06F 17/30899 709/217 |
| 7,890,856 B2 | 2/2011 | Chiang | |
| 7,996,766 B2 | 8/2011 | Chiang | |
| 2001/0012023 A1 * | 8/2001 | Kobayashi ............ | G06F 3/0481 715/835 |
| 2001/0037359 A1 * | 11/2001 | Mockett et al. ............... | 709/203 |
| 2001/0037407 A1 * | 11/2001 | Dragulev .......... | G06F 17/30867 709/250 |
| 2001/0047477 A1 | 11/2001 | Chiang | |
| 2002/0010723 A1 | 1/2002 | Nielsen | |
| 2002/0012010 A1 * | 1/2002 | Pasquali ............ | G06F 17/30899 715/719 |
| 2002/0023111 A1 | 2/2002 | Arora | |
| 2002/0054126 A1 | 5/2002 | Gamon | |
| 2002/0054138 A1 | 5/2002 | Henum | |
| 2003/0005033 A1 * | 1/2003 | Mohan et al. ................. | 709/202 |
| 2003/0069888 A1 * | 4/2003 | Pasquali ............ | G06F 17/30899 |
| 2003/0149697 A1 * | 8/2003 | Pasquali ............ | G06F 17/30899 |
| 2003/0208491 A1 * | 11/2003 | Pasquali ............ | G06F 17/30899 |
| 2004/0093563 A1 * | 5/2004 | Pasquali ............ | G06F 17/30899 715/234 |
| 2004/0205594 A1 | 10/2004 | Arora | |
| 2007/0118793 A1 | 5/2007 | Arora | |
| 2007/0180367 A1 | 8/2007 | Chiang | |
| 2007/0198914 A1 | 8/2007 | Chiang | |
| 2007/0276903 A1 | 11/2007 | Chiang | |
| 2008/0155012 A1 | 6/2008 | Chiang | |
| 2011/0145696 A1 | 6/2011 | Chiang | |

OTHER PUBLICATIONS

"Desktop Toolbar," Idealab, www.desktop.com, 2006; 1 page.

(56) References Cited

OTHER PUBLICATIONS

"This Domain Name Has Just Been Registered for One of Our Customers," www.broadpage.com, downloaded 2008, 1 page.
"Welcome to katiesoft.com," katiesoft.com, www.katiesoft.com, 2008; 1 page.
"Making you faster," Opera Software ASA., www.opera.com, 2008; 4 pages.
"Related Searches," MDNH, Inc., www.mywebos.com, 2008; 1 page.
"Slash cost and simplify," Cixtrix Systems, Inc., www.citrix.com, 1999-2008; 1 page.
Business Wire, "Motorola Invests in Online Anywhere Author Once, View Anywhere Web Pages on Small Internet Device," Oct. 19, 1998; 2 pages.
AT&T Laboratories Cambrige, "AT&T Laboratories Cambridge," Jan. 1999; www.uk.research.att.com; 1 page.
Snell, N., "Sams Teach Yourself the Internet in 24 Hours, Third Edition," Jun. 17, 1999, Sams, Third Edition; 3 pages.
Stanek, W.R., "Essential HTML 4.0 Technology Information," PC Magazine, Oct. 20, 1999; 11 pages.
"New Internet Software Program Puts Users in Charge of What They Get From the Web," Business Wire, Oct. 25, 1999; 4 pages.
U.S. Appl. No. 09/565,155, filed May 3, 2000; Chiang; 109 pages.
International Search Report for PCT/US01/07244, dated May 21, 2001; 6 pages.
USPTO: Non-Final Office Action/Restriction Requirement dated Jan. 26, 2004, U.S. Appl. No. 09/565,155, filed May 3, 2000; 5 pages.
USPTO: Non-Final Office Action dated Aug. 24, 2004, U.S. Appl. No. 09/812,634, filed Mar. 20, 2001; 20 pages.
USPTO: Non-Final Office Action dated Sep. 22, 2004, U.S. Appl. No. 09/565,155, filed May 3, 2000; 26 pages.
USPTO: Final Office Action dated Apr. 8, 2005; U.S. Appl. No. 09/812,634, filed Mar. 20, 2001; 16 pages.
USPTO: Non-Final Office Action dated Dec. 20, 2005; U.S. Appl. No. 09/812,634, filed Mar. 20, 2001; 21 pages.
USPTO: Final Office Action dated Mar. 21, 2006, U.S. Appl. No. 09/565,155, filed May 3, 2000; 27 pages.
USPTO: Final Office Action dated May 31, 2006, U.S. Appl. No. 09/812,634, filed Mar. 20, 2001; 21 pages.
USPTO: Non-Final Office Action dated Sep. 8, 2006, U.S. Appl. No. 09/565,155, filed May 3, 2000; 27 pages.
USPTO: Final Office Action dated Apr. 5, 2007, U.S. Appl. No. 09/565,155, filed May 3, 2000; 31 pages.
USPTO: Non-Final Office Action dated Nov. 14, 2007, U.S. Appl. No. 09/565,155, filed May 3, 2000; 29 pages.
USPTO: Final Office Action dated Jun. 12, 2008, U.S. Appl. No. 09/565,155, filed May 3, 2000; 30 pages.
USPTO: Non-Final Office Action dated Aug. 4, 2008, U.S. Appl. No. 11/515,148, filed Aug. 31, 2006; 15 pages.
USPTO: Non-Final Office Action dated Aug. 5, 2008, U.S. Appl. No. 11/515,433, filed Aug. 31, 2006; 19 pages.
USPTO: Non-Final Office Action dated Oct. 24, 2008, U.S. Appl. No. 09/565,155, filed May 3, 2000; 28 pages.
USPTO: Non-Final Office Action dated Oct. 28, 2008, U.S. Appl. No. 11/515,460, filed Aug. 31, 2006; 24 pages.
USPTO: Non-Final Office Action, dated Oct. 29, 2008, U.S. Appl. No. 11/515,461, filed Aug. 31, 2006, 28 pages.
USPTO: Final Office Action dated Feb. 4, 2009, U.S. Appl. No. 11/515,148, filed Aug. 31, 2009; 17 pages.
USPTO: Final Office Action dated Feb. 13, 2009, U.S. Appl. No. 09/565,155, filed May 3, 2000; 28 pages.
USPTO: Final Office Action dated Apr. 2, 2009, U.S. Appl. No. 11/515,433, filed Aug. 31, 2006; 19 pages.
USPTO: Final Office Action dated Apr. 30, 2009, U.S. Appl. No. 11/515,461, filed Aug. 31, 2006; 34 pages.
USPTO: Final Office Action dated May 12, 2009, U.S. Appl. No. 11/515,460, filed Aug. 31, 2006; 27 pages.
USPTO: Non-Final Office Action dated Jul. 2, 2009, U.S. Appl. No. 11/515,148, filed Aug. 31, 2009; 15 pages.
USPTO: Non-Final Office Action dated Jul. 21, 2009, U.S. Appl. No. 09/565,155, filed May 3, 2000; 33 pages.
Internet Archive Wayback Machine, www.uk.research.att.com, Retrieved Aug. 13, 2009; 2 pages.
USPTO: Non-Final Office Action dated Sep. 17, 2009, U.S. Appl. No. 11/515,461, filed Aug. 31, 2006, 32 pages.
USPTO: Non-Final Office Action dated Sep. 17, 2009, U.S. Appl. No. 11/515,433, filed Aug. 31, 2006, 22 pages.
USPTO: Non-Final Office Action dated Sep. 28, 2009, U.S. Appl. No. 11/515,460, filed Aug. 31, 2006, 23 pages.
USPTO: Final Office Action dated Nov. 24, 2009, U.S. Appl. No. 11/515,148, filed Aug. 31, 2006, 16 pages.
USPTO: Final Office Action dated Mar. 9, 2010, U.S. Appl. No. 09/565,155, filed May 3, 2000; 33 pages.
USPTO: Final Office Action dated Mar. 17, 2010, U.S. Appl. No. 11/515,461, filed Aug. 31, 2006; 30 pages.
USPTO: Final Office Action dated Mar. 26, 2010, U.S. Appl. No. 11/515,433, filed Aug. 31, 2006; 13 pages.
USPTO: Non-Final Office Action dated Mar. 29, 2010, U.S. Appl. No. 11/510,055, filed Aug. 25, 2006; 7 pages.
USPTO: Final Office Action dated Mar. 9, 2010; U.S. Appl. No. 11/515,460, filed Aug. 31, 2006; 25 pgs.
USPTO: Final Office Action dated Mar. 26, 2010, U.S. Appl. No. 11/515,433, filed Aug. 31, 2006; 13 pages.
USPTO: Advisory Action dated Mar. 30, 2010, U.S. Appl. No. 11/515,148, filed Aug. 31, 2006; 3 pages.
USPTO: Advisory Action dated Jun. 3, 2010, U.S. Appl. No. 11/515,460, filed Aug. 31, 2006; 4 pages.
USPTO: Advisory Action dated Jun. 8, 2010, U.S. Appl. No. 09/565,155, filed May 3, 2000; 4 pages.
USPTO: Advisory Action dated Jun. 30, 2010, U.S. Appl. No. 11/515,433, filed Aug. 31, 2006; 3 pages.

* cited by examiner

SERVER SIDE WEB BROWSING AND MULTIPLE LENS SYSTEM, METHODS AND APPARATUS

CROSS REFERENCE TO RELATED APPLICATIONS

This application is a continuation of U.S. patent application Ser. No. 11/515,433 filed Aug. 31, 2006 (now U.S. Pat. No. 7,890,856 granted on Feb. 15, 2011), which is a divisional of U.S. patent application Ser. No. 09/565,155, filed May 3, 2000, which claims priority from provisional U.S. Patent Application No. 60/187,434, filed Mar. 7, 2000, the disclosures of which are incorporated herein in their entirety.

FIELD

A server-side web browsing and multiple lens system, method and apparatus directed to electronic document processing, and more particularly directed to structured electronic documents (e.g. HTML, XML) which present multiple web pages within a single browser window.

BACKGROUND

In general, computer application programs may be implemented in two ways. First, a user may load and execute a local application program. Local application programs have processing instructions that are stored in a memory of the same computing device from which the user executes commands. In order to receive upgrades to these applications, a user must download and install any new version of the software. Because such local applications are also computer specific, they also do not provide personalized web browsing capability specific to a particular user and independent of the browser, platform, machine and/or location of the user.

Remote applications are accessed and implemented by a user over a computer network, such as the Internet. Generally, a user may access a remote server and request that an application be activated. The remote server then transmits display data and processing instructions to the user's computing device over the network. Such "thin-client" devices, e.g., wireless and handheld devices, are limited by memory, screen size, processing and bandwidth constraints. In applications involving such devices, the commands must first be transmitted from the user's computing device to the remote server that runs the application. These applications are advantageous in that any upgrades to the software may be implemented by an operator of the server, rather than being downloaded and installed by each individual user.

One type of frequently-used application program is a web browsing application or "browser" which is generally used to view information on the Internet, such as pages of HTML data, graphical data (e.g. data presented in a GIF format, TIFF format or JPEG format), and multimedia presentations (e.g. data presented in MPEG formats). Most common web browsers present a single display area in which web page content is presented. Examples of such browsers include INTERNET EXPLORER 3.0 and NETSCAPE NAVIGATOR 4.0. The window in which the browser is active typically has navigational controls such as a horizontal scroll bar, a vertical scroll bar, a minimize command button, a maximize command button, a forward command button, a backward command button and a close window lens command button. Such controls are specific to the browser application in the displayed window and are typically implemented by the operating system (e.g. WINDOWS 95/98/NT/2000) rather than the browser itself.

Typically, users will visit more than one web page or web site in each browsing session, and will often want to return to and make comparisons with a previously-viewed page. Consequently, browsers with a single display area are troublesome in that a user must open multiple windows on their computing device if they wish to view more than one web page at a time. To view a previous page in such browsers, the user must repeatedly select a "back" button until the previously-viewed page is displayed. These limited features inhibit navigation on the Internet. Limited navigation ability is particularly pertinent to thin-client devices where memory, screen size, processing and bandwidth are constrained or limited.

Recently, several browsers have been introduced which provide separate display areas that allow viewing of more than one web page. One example of this type of browser is INTERNET EXPLORER 5.0 which allows a designated search page to be presented in a smaller display area of the window in which the browser is active. A larger display area is provided within the same window to view a current web page accessed by the user. However, INTERNET EXPLORER 5.0 does not provide separate navigational controls for the separate display areas within the window. Also, a user may not specify a web page other than a designated search page for presentation in the smaller display area.

A second example of a multiple-view web browser is the browser of BROADPAGE.COM. Each display area in the BROADPAGE.COM browser has independent navigational controls. However, the browser is a local application, not a remote application. Furthermore, multiple views are presented in a tiled fashion rather than side-by-side, so that portions of previously viewed documents become partially obscured when selecting a new web page to view. The browser of KATIESOFT.COM is another example of a local application where the multiple views are presented in a non-overlapping manner.

In addition to the shortcomings presented above, current browsers suffer from other limitations in their functionality. For example, browsers typically include the ability to bookmark a web page that is being viewed. Bookmarking, as referred to herein, is the process by which a user designates that a web page identifier (e.g. a uniform resource locator (URL)) is to be stored within the browser so that, upon later selection of the stored address, the web page may be viewed. Currently, several steps must be taken to bookmark a web page after it is presented to the user. First, the user must typically activate a general bookmark command button. Next, the user must designate that the bookmark is to be added to a bookmark folder, and, perhaps, determine a location within the folder to which the bookmark information is to be stored. Finally, a confirmation of the bookmark must be entered. Thus, bookmarking has traditionally been a multi-step process.

Another disadvantage of common browser systems is that bookmarks are saved in the local computer device. Thus, they are not portable from one device to another.

Still another disadvantage of common browsers is that they generally do not allow the entire content of a web page to be viewed at once. Many web pages contain content, the size or length of which may exceed the display area of a browser window. Typically, browsers rely on the scroll bar functions provided by the operating system to allow a user to scroll through the web site content. The ability to reformat a web page so that its entire content can be viewed within the display area of a window without scrolling has not been possible in earlier browsing systems. The need for reformatting web pages is particularly pertinent to thin-client devices with limited screen displays.

SUMMARY

The above-identified problems are solved and a technical advance is achieved by a server side web browsing and multiple lens system, method and apparatus. One advantage of the system, method and apparatus is that a host server presents centralized memory and processing to facilitate communications with thin-client devices.

Another advantage of the host server is to present multiple web page information to a user through server-side programming, which facilitates web page persistence across session, browser, device and location, i.e., the host server provides personalized web browsing capability specific to a particular user independent of the browser, platform, device and/or location of the user.

Yet another advantage of the host server is that it enables translations on the fly from one protocol received from a third party server to another protocol for display to a user on a remote device. For example, the remote server can reformat web content received from a third party server so that it can be displayed within the display area of a user's device. Consequently, a user may view the entire contents of a reformatted web page within the display area of a single lens or browser window, i.e., a miniaturized full view screen in lieu of using a horizontal or vertical scroll bar. The host server can further translate any input language (e.g., HTML, CSS, XML, XSL, XHTML, WML) to any output language (e.g., HTML, WML) for display to a particular use.

Still another advantage of the host server is that it provides a centralized memory to store bookmarks and cookies so that they are portable from one device to another device. It is a further advantage of the system, method and apparatus that a user may bookmark a web page or a plurality of web pages with a single command and store it.

It is yet another advantage of the system, method and apparatus that each lens may have multiple cookies associated therewith. Alternatively, a cookie may be stored so that it is associated with a particular user regardless of the browser, platform, device and/or location of the user. Storing cookies on the server-side allows an unlimited number and size of cookies to be stored per user or lens. The server-side storage capacity for such cookies is particularly pertinent to thin-client devices which have limited storage capacity.

Still another advantage of the system, method and apparatus is that a user may simultaneously view and interact with a plurality of web pages within a single browser window through one or more lenses wherein each lens controls server-side web browsing through an independent and full range of navigational controls, i.e., full browser control capability.

An advantage of the server-side browsing capability of the system, method and apparatus is that it enables multiple browsers for thin-client devices limited by memory, screen size, processing and bandwidth constraints.

Yet another advantage of the system, method and apparatus is that one lens can control the web content displayed in another lens. For example, one lens can be used to conduct a search and the results of the search can be displayed in another lens.

In one embodiment, the system, method and apparatus presents web content to a user at a remote device. According to the embodiment, a host server transmits display information to the user comprising at least one lens for presentation within a window of a browser on the user's device. Any number of lenses can be used in the system, method and apparatus. In alternative embodiments, the number of lenses are two, four or a plurality of lenses.

Each lens controls server-side web browsing and is operative to display a separate web page upon receiving a uniform resource locator or other web identifier (collectively "URL") from the user. Each lens controls server-side browsing through any number and type of navigational controls such as a uniform resource locator entry field, a horizontal scroll bar, a vertical scroll bar, a minimize command button, a maximize command button, a close lens command button, a forward command button, a backward command button, a bookmark command button, a reformat command button or a menu command button. In another embodiment, a lens may have a full rage of navigational controls, i.e., full browser control capability. In still another embodiment, one lens may control the web content displayed in another lens.

In other embodiments, the host server may receive an identifier from a user, verify the identifier and transmit display information to the user, such that the user has web page persistence across session, platform, browser, device and location. The host server may also store at least one cookie associated with each lens or with a user's identifier. The host server may further receive a single bookmark command to bookmark a web page presented to a user and store a bookmark identifier corresponding to the web page.

In still another embodiment, the host server translates any protocol received by a third party server to a second protocol to be presented to a user on a remote device. The server receives from a third party server web page display data in a first language, such as hypertext markup language (HTML), cascading style sheet language (CSS), extensible markup language (XML), extensible stylesheet language (XSL), extensible hypertext markup language (XHTML) or wireless markup language (WML) and translates the data into a second language, such as HTML or WML, for presentation on the remote device.

In yet another embodiment, the web page display data received by the host server from a third party server is reformatted by the host server so that substantially all of the display data can be displayed within the display area of the lens or window on the remote device. The server determines the size of the display area of the lens or window of a remote device. If the size of the display data is greater than the size of the display area, the server reformats the display data so that it can be presented with the display area of the lens. The server can reformat the size of the display data to be substantially equal to the size of the display area. Alternatively, if the size of the display data is less than the size of the display area, the server can reformat the size of the display data to be substantially equal to the size of the display area.

In still another embodiment, a user transmits a request to the server to reformat a web page. In response to the request, the host server reformats the web page so that substantially all of the display data is displayed within the display area of the user's lens or window, such that the user does not have to use a horizontal or vertical scroll bar to view the data. In an alternative embodiment, the web page can be reformatted by the server to any percentage of its original size selected by the user.

It is not intended that the server-side web browsing and multiple lens system, method and apparatus be summarized here in its entirety. For example, the system, method and apparatus is also directed to a remote device for receiving display information from the host server, including at least one lens present within a window of a browser on the remote device, wherein each lens controls server-side web browsing. The system, method and apparatus is further directed to a computer readable medium having computer executable software code stored thereon for presenting, through a host server, web content to a user at a remote terminal and for receiving web content at a remote device. Further features, aspects and advantages of the system, method and apparatus are set forth in or are apparent from the following brief and detailed descriptions and drawings and claims which follow.

BRIEF DESCRIPTION OF THE DRAWINGS

Further aspects of the server-side web browsing and multiple lens system, method and apparatus will be more readily appreciated upon review of the detailed description set forth below when taken in conjunction with the accompanying drawings, of which.

It will be understood that the foregoing brief description and the following detailed description are exemplary and explanatory of this invention, but are not intended to be restrictive thereof or limiting of the advantages which can be achieved by this invention. Thus, the accompanying drawings, referred to herein and constituting a part hereof, illustrate embodiments of this invention and, together with the detailed description, serve to explain the principles of this invention.

DETAILED DESCRIPTION

Figure 1:
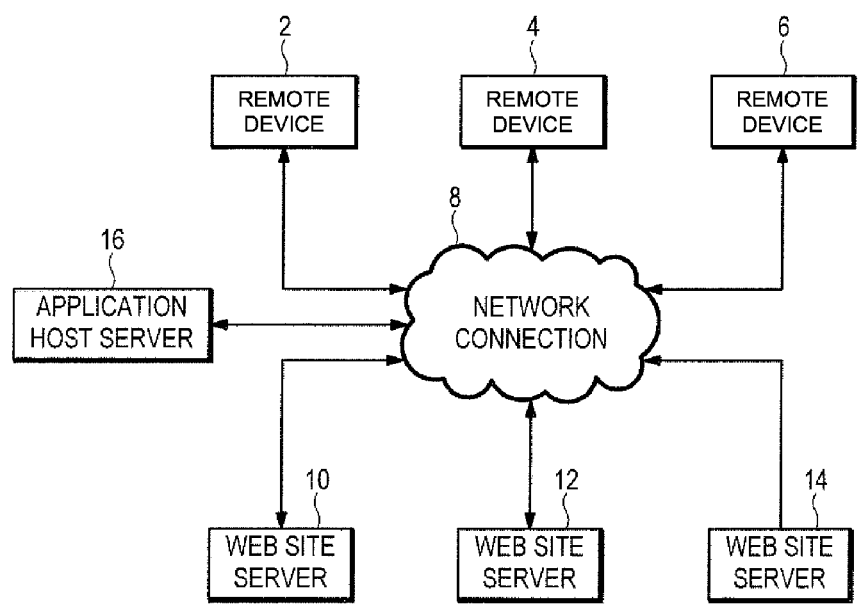
FIG. 1 is a block diagram illustrating an exemplary computer network including the application host server.

Referring now to FIG. 1, in general, the server-side web browsing and multiple lens system, method and apparatus allows a user at a remote device 2 to access an application host server 16 which implements multiple lens displays. The server 16 generates appropriate display data and transmits the same to the user for display within a single window of a local web browsing application. The display data formats the window to present at least one lens. The display data can be customized for each user to present data through as many lenses as suits a user's needs, e.g., two, three, four, five, six or more lenses can be presented. The lenses can also be formatted in any shape or orientation.

Each lens controls server-side web browsing through independent navigational controls. The controls allow a user to, inter alia: (i) select a web page URL to be displayed; (ii) navigate backward and forward through a viewing history of web pages; (iii) scroll up or down or from side to side; (iv) maximize or minimize selected web pages; and (v) bookmark a web page with a single command. Such server-side browsing is accomplished by a server which presents command buttons or text entry fields having embedded commands associated therewith. The embedded commands generally take the form of:

http:// <server>:<port>/<multiple lens system>/?JLMClick=<command>[&<attribute name>=<attribute value>. . .]

where:
server=the host name of the server running the multiple lens system;
port=the port number on which the multiple lens system receives commands;
multiple lens system=the resource name of the multiple lens system;
command=the different commands for various lens operations described below;
attribute name=the argument name of a specific command; and
attribute value=the argument value of a specific command The commands used to implement the server-side web browsing and multiple lens system generally include the following:

| NAME: | ATTRIBUTE: | ACTION: |
|---|---|---|
| JLSShowCurrentDesktop | None | Instructs the server to show the current web pages within a single window. The server keeps a copy of the web page identifiers so that in the event of a network interruption or user sign-out, the same display of web pages will persist across sessions. |
| JLSShowTile | JLVRows, JLVColumns | Tiles all lenses into JLVRows and JLVColumns. If one or both attributes are not specified, current row and column values are taken from the operating system of the user's device values. |
| JLSShowRow | JLVRow | Shows all lenses on a horizontal row of the window. JLVRow contains the row number starting from, i.e. 1 at the top of the window. |
| JLSShowLens | JLVLens, JLVType | Shows a lens. JLVLens specifies the coordinates of the lens where, i.e. 11 may designate the top left position, i.e., 12 the top right position, i.e., 21 the bottom left position, and i.e., 22 the bottom right position. JLVType specifies how to show the lens (e.g. minimized or maximized). |
| JLSShowTitle | JLV Lens, JLVType | Shows the title bar of a web page displayed in a lens. |
| JLSShowCurrentView | JLVLens | Shows the current view of a |

-continued

| NAME: | ATTRIBUTE: | ACTION: |
|---|---|---|
| JLSShowPreviousView | JLVLens | Shows the previous view of a lens. |
| JLSShowNextView | JLVLens | Shows the next view of a lens. |
| JLSShowSystemMenu | JLVLens | Shows menu web page in a lens. |
| JLSAddLens | JLVTitleText, JLVIcon | Adds a lens to the window. |
| JLSRemoveLens | JLVLens | Removes a lens from the window. |
| JLSGetLenses | None | Retrieves the number of lenses displayed in the window. |
| JLSGetRows | None | Retrieves the number of rows in the window. |
| JLSGetColumns | None | Retrieves the number of columns in the window. |
| JLSGetTitleText | JLVLens | Retrieves the title text of a lens. |
| JLSGetIcon | JLVLens | Retrieves the icon of a lens. |
| JLSSetRows | None | Sets the number of rows in the window. |
| JLSSetColumns | None | Sets the number of columns in the window. |
| JLSSetTitleText | JLVLens | Sets the title text of a lens. |
| JLSSetIcon | JLVLens | Sets the icon of a lens. |

The commands may implement programming scripts, such as may be generated in JAVASCRIPT, to perform the corresponding action. In response to these commands, the server 16 generates output in a suitable browser-compatible language such as HTML. The output includes use of FRAME or IFRAME commands to generate a multiple lens display. For each new command received from the user, the output is regenerated and re-transmitted by the server 16 for display on the remote device 2. The output may be further updated if a selected web page in the display transmits refresh information or new data.

In an example of the use of these commands, a server 16 may authenticate a user who is accessing the multiple lens system. After authentication, the user, through the local web browser, transmits to the server 16 a redirection command including the JLSShowCurrentDesktop command. The server 16 may reply to the command by, for example, outputting HTML framing commands which set title bars, status bars, display areas and borders for all the lenses to be displayed in a window controlled by the local browser. When the user wants to change the layout of the window or when the user adds or removes lenses from the window, the local browser transmits a JLSShowTile command to the server 16 which in turn will tile all the lenses according to current row and column parameters.

Turning again to FIG. 1, there is depicted an exemplary computer network arrangement through which a plurality of remote devices 2, 4, 6 may communicate with server 16 and a plurality of third-party servers 10, 12, 14 via network connection 8 in any known manner. Computer network connection 8 can be an Internet-based network such as the World Wide Web. It may also be any one or more of a local area network (LAN), a wide-area network (WAN), an intranet environment, an extranet environment, a wireless network or any other type of computer network, such as those enabled over public switched telephone networks.

Remote devices 2, 4, 6 may each be any type of computing device, such as a personal computer, a workstation, a network terminal, a hand-held remote access device, a personal digital assistant (PDA) or any other device, including wireless devices, that can accomplish two-way electronic communication over the network connection 8. Specific functions and operations of remote devices 2-6, third-party web site servers 10, 12, 14 and application host server 16 are discussed further below.

Figure 2:
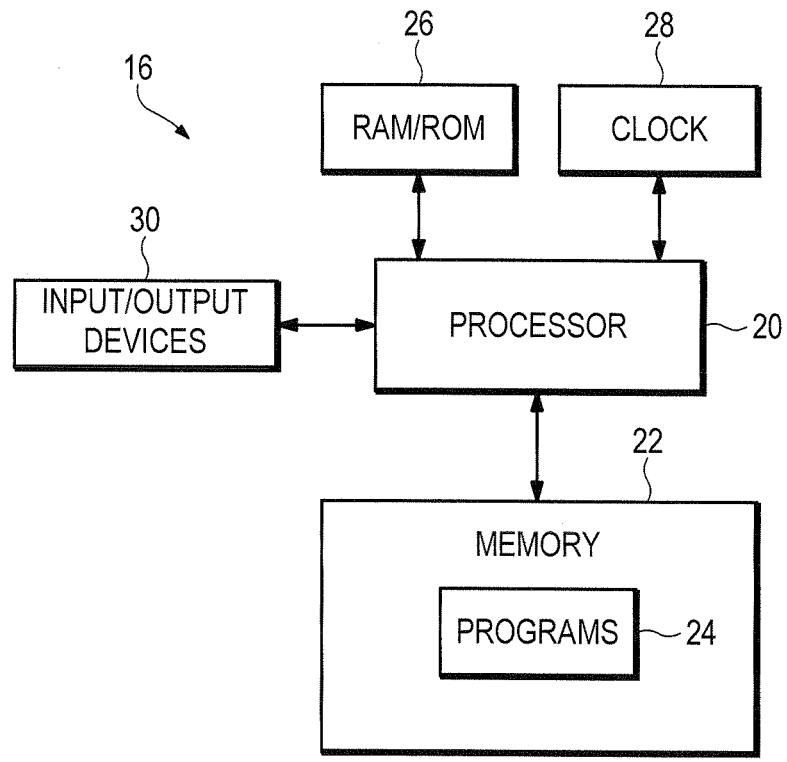
FIG. 2 is a block diagram of exemplary components of an application host server for use with the system of FIG. 1.
Figure 3:
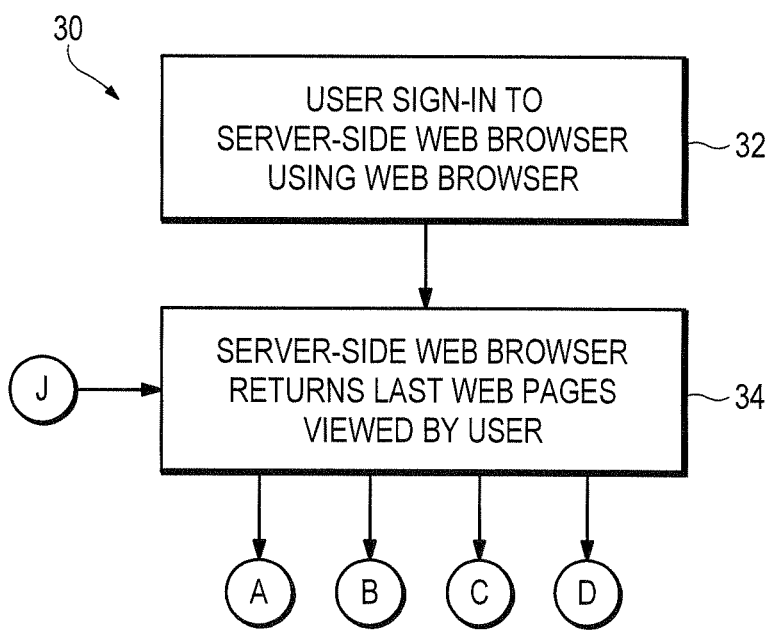
FIGS. 3-12 are a flowchart of an exemplary process by which a user may simultaneously view and bookmark a plurality of web pages.
Figure 4:
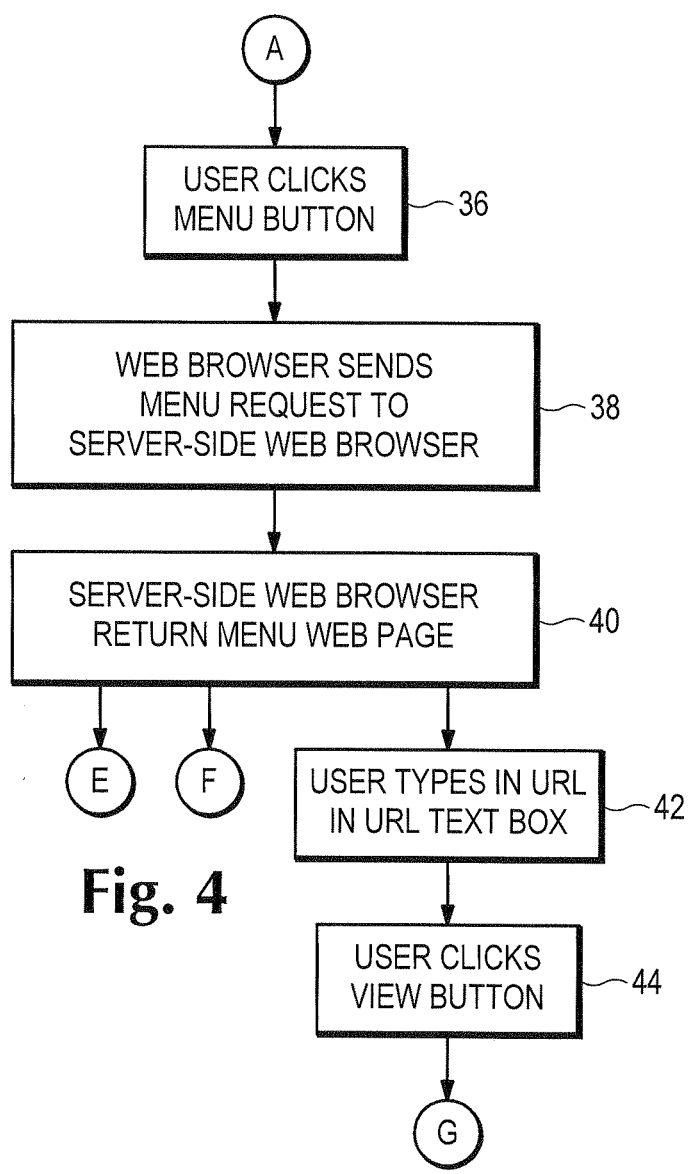
Figure 5:
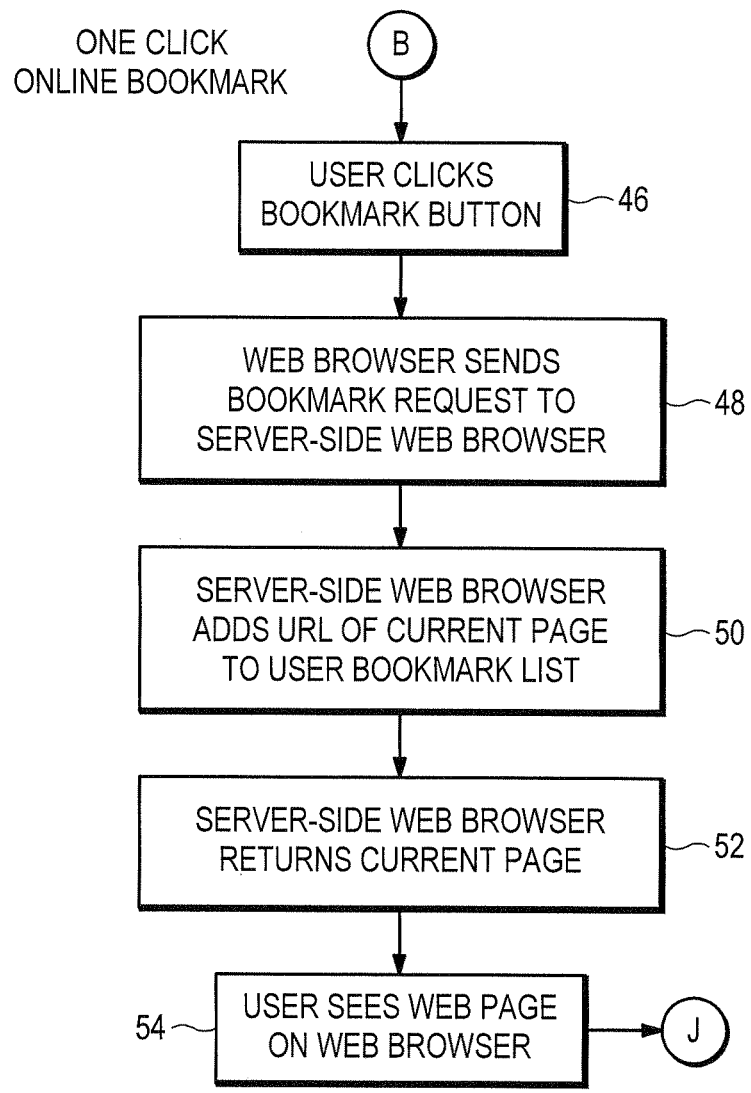

Turning now to FIG. 2, displayed therein are exemplary components of a computing device, such as server 16. Any of user remote devices 2, 4 and 6 or third-party web site servers 10, 12, 14 may share a similar configuration as follows. The primary component of server 16 is processor 20, which may be any commonly available microprocessor, such as the PENTIUM III manufactured by INTEL CORP. The processor 20 may be operatively connected to further exemplary components, such as RAM/ROM 26, a clock 28, input/output devices 30, and a memory 22 which, in turn, stores one or more computer programs 24.

Processor 20 operates in conjunction with random access memory and read-only memory. The random-access memory (RAM) portion of RAM/ROM 26 may be a suitable number of Single In-line Memory Module (SIMM) chips having a storage capacity (typically measured in kilobytes or megabytes) sufficient to store and transfer, inter alia, processing instructions utilized by processor 20 which may be received from application programs 24. The read-only memory (ROM) portion of RAM/ROM 26 may be any permanent non-rewritable memory medium capable of storing and transferring, inter alia, processing instructions performed by processor 20 during a start-up routine of server 16.

Clock 28 may be an on-board component of processor 20 which dictates a clock speed (typically measured in MHz) at which processor 20 performs and synchronizes, inter alia, communication between the internal components of server 16.

Input/output device(s) 30 may be one or more known devices used for receiving operator inputs, network data, and the like and transmitting outputs resulting therefrom. Accordingly, exemplary input devices may include a keyboard, a mouse, a voice recognition unit and the like for receiving operator inputs. Output devices may include any known devices used to present data to an operator of the server 16 or to transmit data over the computer network connection 8 to a remote user or customer. Accordingly, suitable output devices may include a display, a printer and a voice synthesizer connected to a speaker.

Other input/output devices 30 may include a telephonic or network connection device, such as a telephone modem, a cable modem, a T-1 connection, a digital subscriber line or a network card, for communicating data to and from other computer devices over computer network connection 8, such as remote device 2. In an embodiment involving a network server, communications devices used as input/output devices 30 can have capacity to handle high bandwidth traffic in order to accommodate communications with a large number of users 2-6.

Memory 22 may be internal or external large capacity device for storing computer processing instructions, computer-readable data, and the like. The storage capacity of the memory 22 is typically measured in megabytes or gigabytes. Accordingly, memory 22 may be one or more of the following: a floppy disk in conjunction with a floppy disk drive, a hard disk drive, a CD-ROM disk and reader/writer, a DVD disk and reader/writer, a ZIP disk and a ZIP drive of the type manufactured by IOMEGA CORP., and/or any other computer readable medium that may be encoded with processing instructions in a read-only or read-write format. Further functions of and available devices for memory 22 will be apparent.

Memory 22 may store, inter alia, a plurality of programs 24 which may be any one or more of an operating system such as WINDOWS 2000 by MICROSOFT CORP., and one or more application programs, such as a web hosting program. The programs 24 may include processing instructions for accomplishing a server-side web browsing system as described herein.

Figure 16:
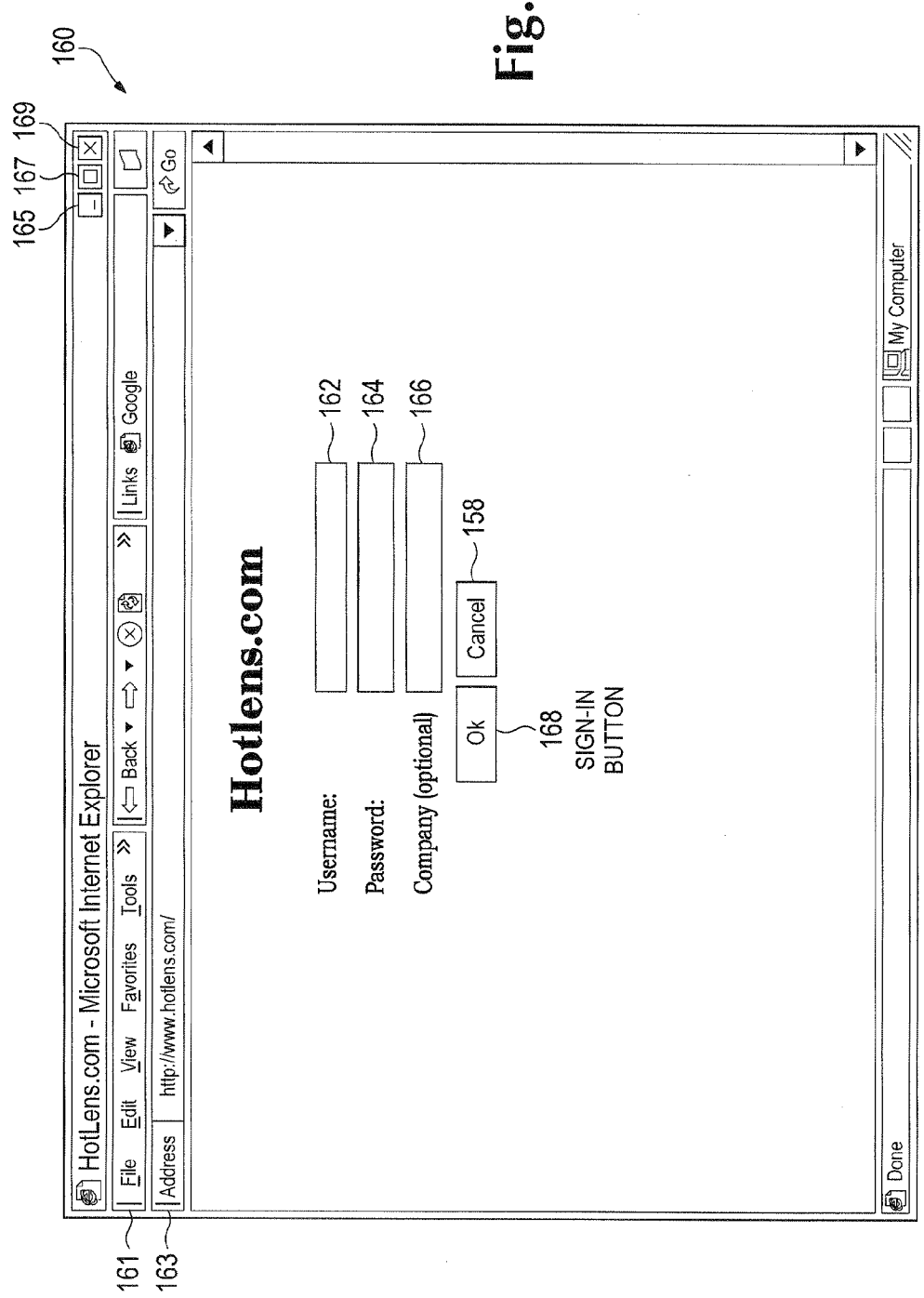
FIG. 16 is an exemplary screen display depicting a user log-in page.

Turning now to FIGS. 3-12, therein is depicted an exemplary process 30 by which a user may simultaneously view a plurality of web pages. The process 30 may begin after a user at a remote device 2 selects the URL of an application host server 16 which offers a server-side, multiple lens, browsing application. As shown in FIG. 16, the URL for the host server 16 may be entered in the URL entry field 163 of the browser residing on the remote device 2. An exemplary sign-in window 160, such as the one presented in FIG. 16, may then be presented to the user. Window 160 can have menu and resize controls which are defined by the operating system residing on the remote device 2. Such menu and re-size controls may include a menu bar 161, a minimize command button 165, a maximize command button 167 and a close window command button 169. The window 160 may furthermore offer navigational controls such as URL entry field 163.

In order to complete the sign-in, the user may enter a user name or other unique identifier into user name field 162 and may further enter a password into password field 164 (step 32). An optional field such as company field 166 may be provided for those users that subscribe to the server 16 through a group affiliation, such as a corporation. Upon entering the field information into field 162, 164 and 166, the user may transmit such information to the remote server by selecting the sign-in button 168 with a pointing device, such as a mouse. If the information has been entered incorrectly or if the user decides not to log into the server 16, the user may select the cancel command button 158 to abort the sign-in.

Figure 18:
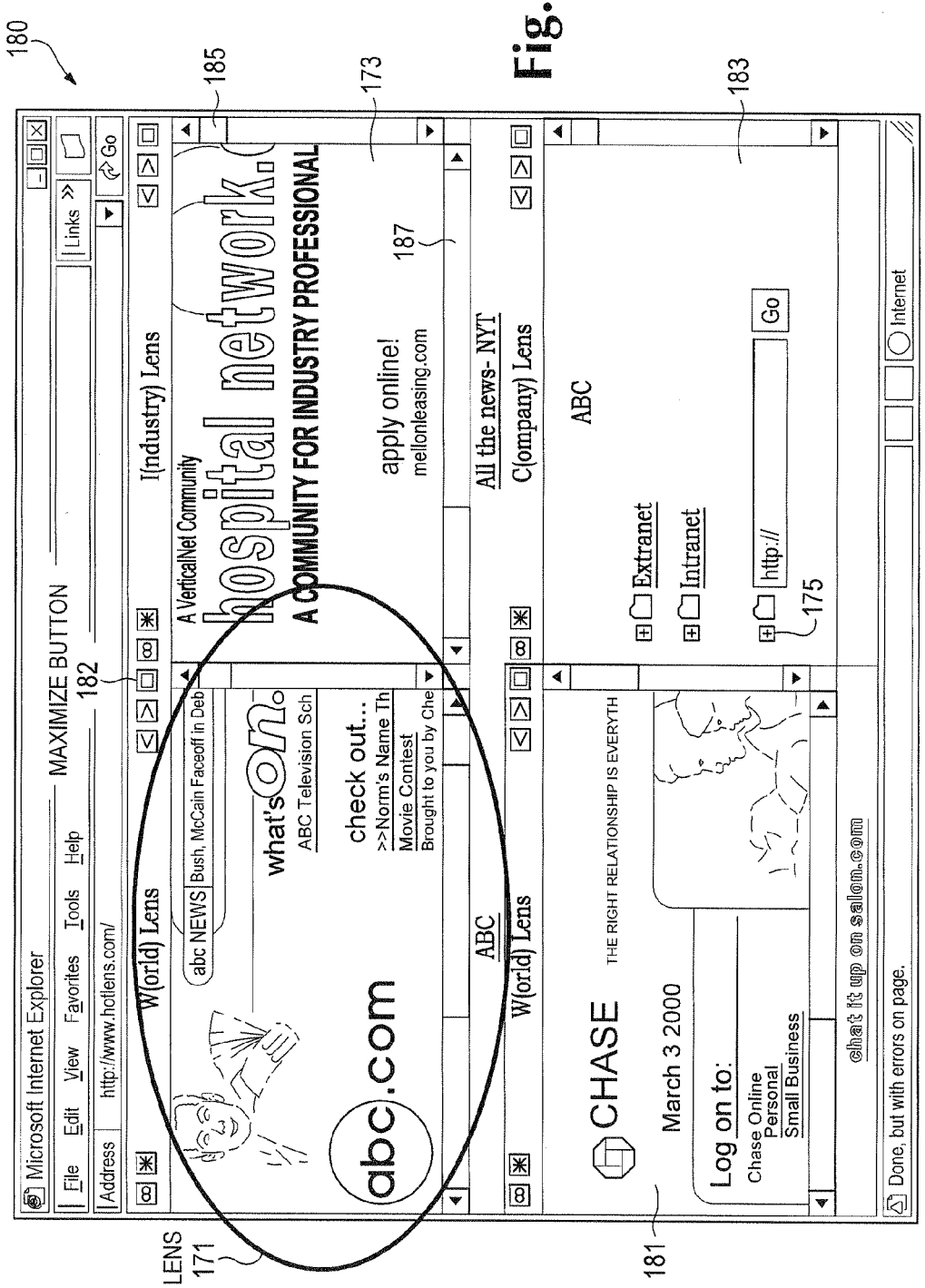
FIG. 18 is an exemplary screen display depicting a plurality of lenses within a single browser window.
Figure 19:
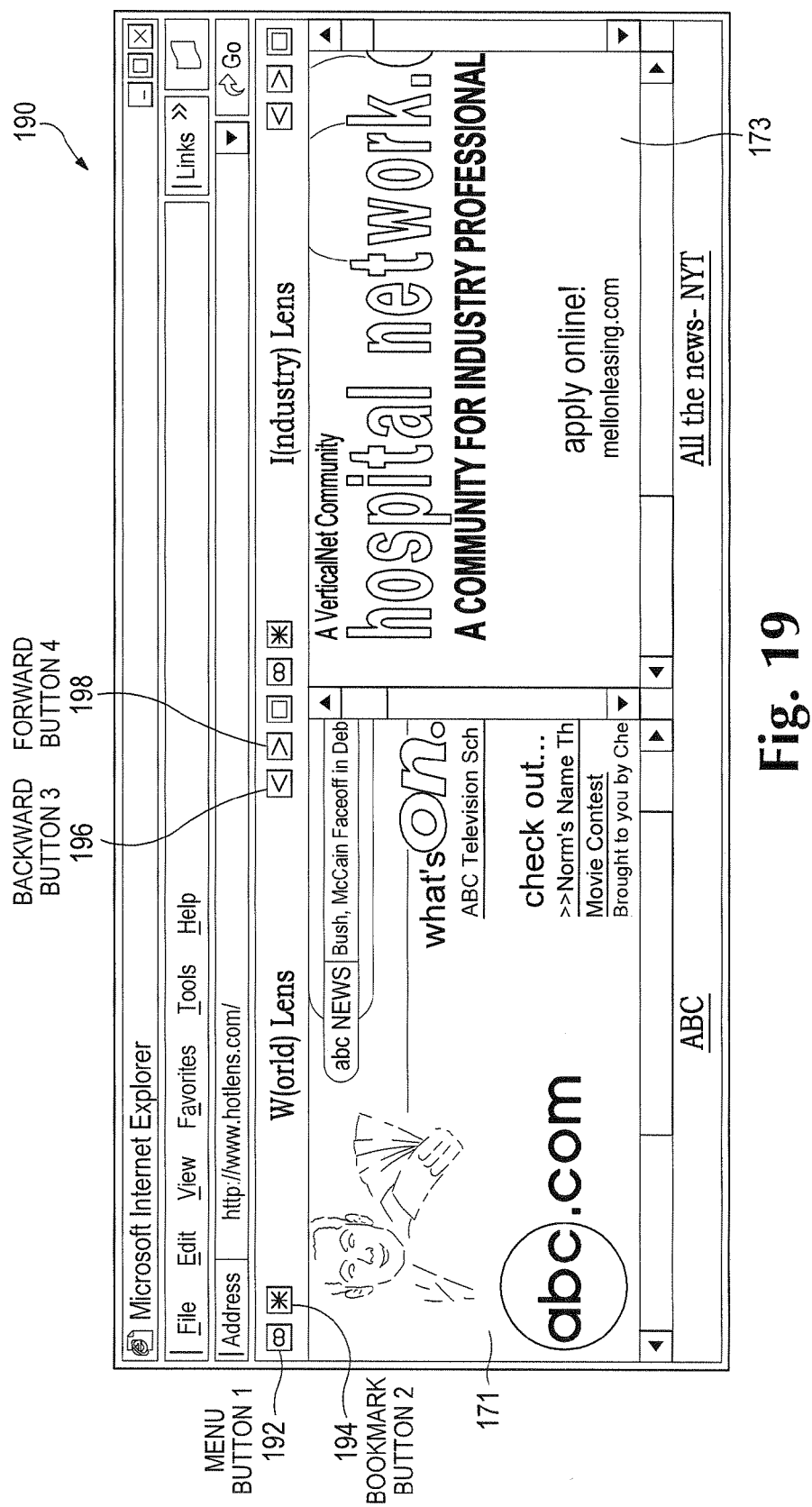
FIG. 19 is an exemplary screen display of a lens having full browser capability.

After signing in, the server 16 may verify the sign-in information provided by the user, e.g., confirm its validity, and transmit a screen display such as that depicted in window 180 of FIG. 18. The screen display may present the last web page(s) browsed by the user (step 34). The window 180 may have at least one lens, two lenses, three lenses, four lenses 171, 173, 181 and 183, or more, each of which may present any URL indicated by the user. Each lens may have independent navigational controls, such as a maximize command button 182, a vertical scroll bar 185, and a horizontal scroll bar 187 as shown in FIG. 18, as well as a menu command button 192, a bookmark button 194, a backward command button 196, and a forward command button 198 as depicted in window 190 of FIG. 19, the functionality of each being described further herein below. Each lens may further have a full range of navigational controls, i.e., full browser control capability.

In one embodiment, one lens may control the web content displayed in another lens. For example, a user may use a first lens as a search engine to conduct an informational search on any topic. The results of the search can be directed by the first lens to be displayed in a second lens.

In some cases, the validity of the sign-in information may be confirmed by matching the user-entered information to user data stored by server 16 in memory 22. The stored user data may be in the form of a secure database (not shown) having a number of records and fields for storing user names, passwords, company affiliation information, a history of web pages viewed by the user, and the like. If there is no data that matches the user-entered information, then the user may not access the server. Otherwise, the process 30 continues as described below.

Figure 17:
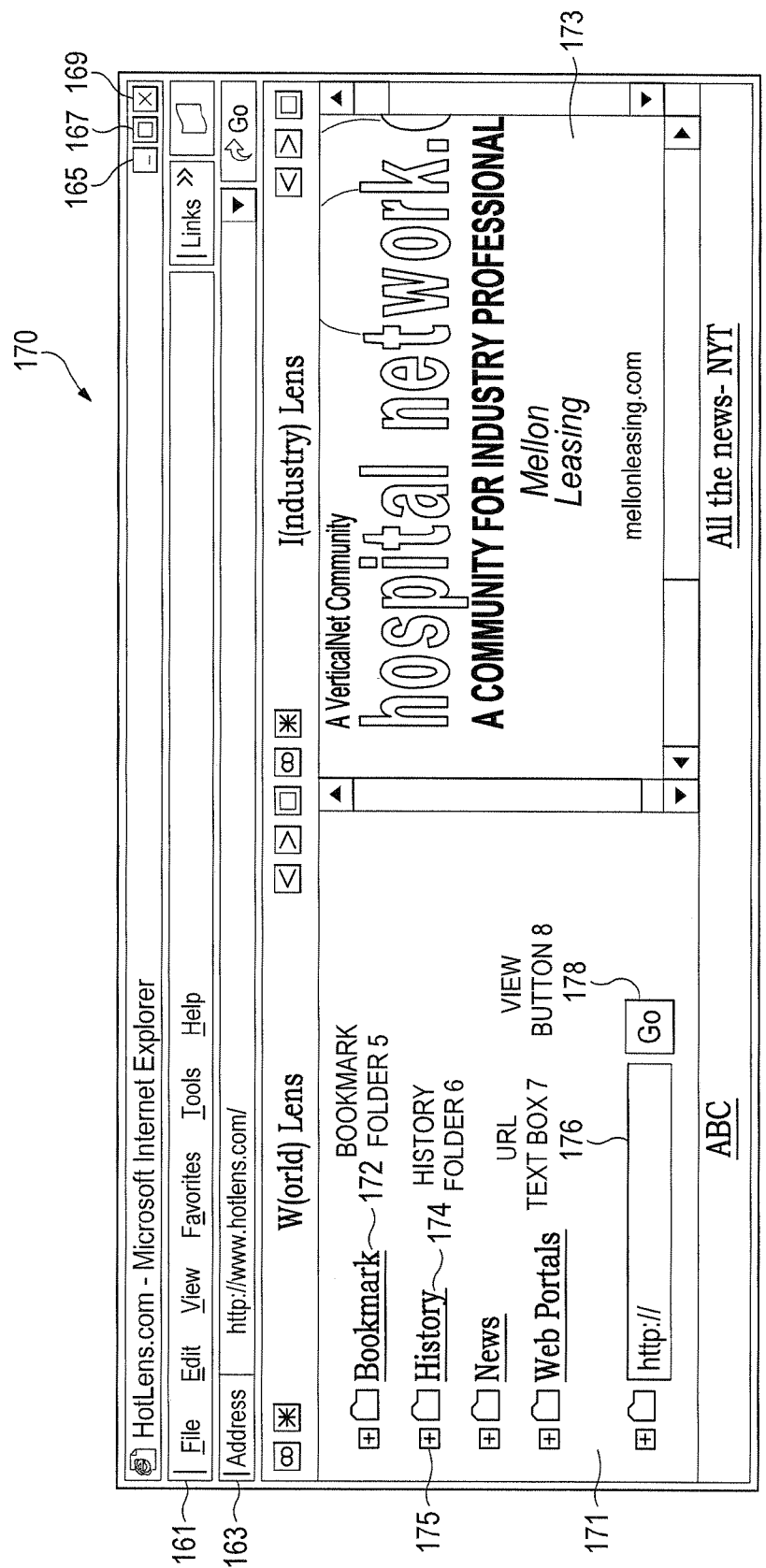
FIG. 17 is an exemplary screen display of a hierarchical tree structure (i.e., a menu) for administering the content of a lens.

From step 34, the user may decide to enter a new page to view, bookmark a page, view a previous page in the user's history or view a next page in the viewer's history. If the user chooses to enter a new web page to view, the process continues to step 36 where the user selects the menu command button 192 from one of the lenses 171, 173, 181, 183 in which the user chooses the web page to be displayed. The menu command button 192 may be selected by using a pointing device such as a mouse or by using a tab feature on the remote device 2 to select the menu command button 192. The local web browser residing on the remote device 2 then electronically forward the command over network connection 8 to the application host server 16 (step 38). In response to the received command, the server 16 can return a menu web page 175 as depicted in FIGS. 17 and 18 (step 40).

The hierarchical tree structure or menu web page 175 enables the user to select a number of options, including selecting a bookmark folder 172, a history folder 174, and a field 176 for entering a URL. The menu web page may further contain a news folder for selecting news articles or web sites, a web portal folder for selecting a desired portal, an intranet option for selecting intranet files, and an extranet folder for selecting extranet files. If the user selects the bookmark folder, the process 30 continues to step 88, as discussed below with respect to FIG. 9. If the user selects the history folder 174, the process continues to step 96 as described below with respect to FIG. 10. Alternatively, the user may instead enter a desired URL into URL entry field 176 (step 42) and then select the view button 178 to transmit the requested URL to the server 16 (step 44). The process 30 then continues to step 104 discussed below in conjunction with FIG. 11.

As described above with respect to step 34, a user may proceed to bookmark a web page after the remote server transmits display information to the user. In such a case, the process 30 continues to step 46 where the user selects the bookmark button 194 in a lens in which the desired web page is displayed. The browser residing on the user's device 2 then transmits the bookmark command to the server 16 over network connection 8 (step 48). The bookmark command may be performed in a single step, that is, by selecting the bookmark command button 194 without additional inputs. The server 16 may then store the bookmark in a location which is accessed through the user's bookmark folder 172 (step 50). The server 16 may then refresh the current web page being viewed (step 52) which is then displayed in the appropriate lens on the user's device 2 (step 54), after which the process 30 returns to step 34, described above.

Figure 6:
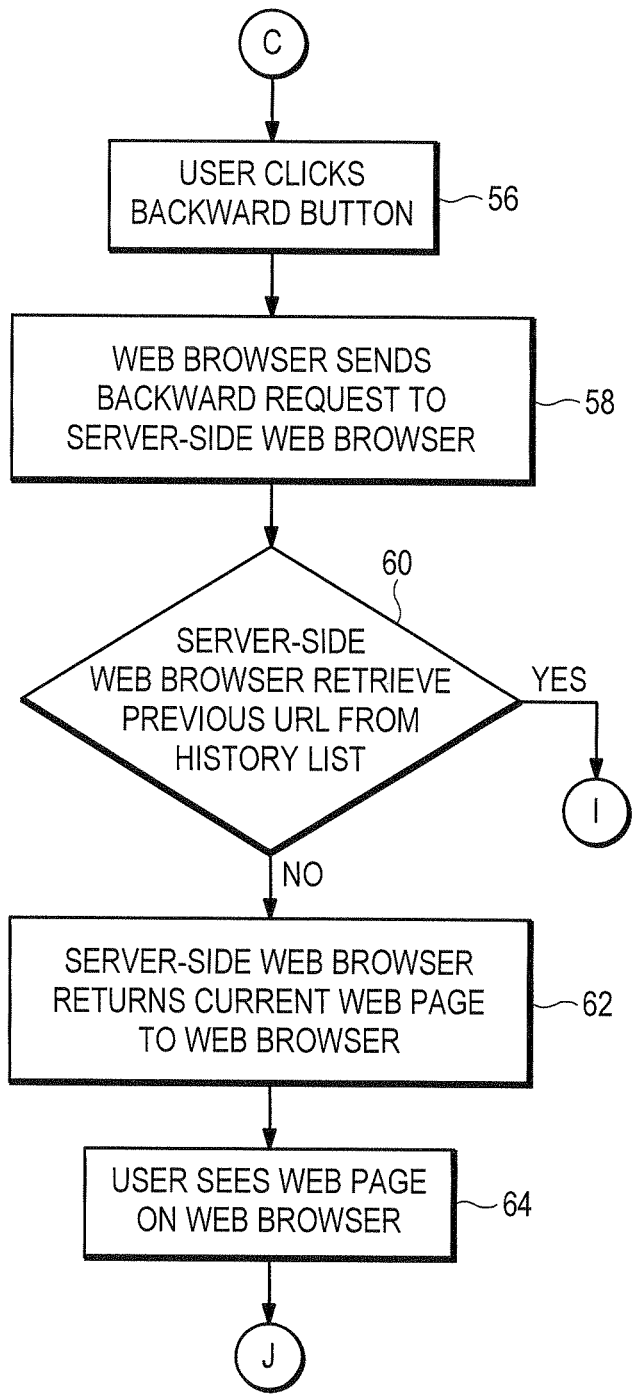

Referring now to FIG. 6, the process 30 may continue from step 34 to step 56 where the user may select the backward command button 196 in a desired lens. Similar to the back command on a standard browser, the backward command is a request to view a previous web page in a viewing history of the selected lens. In response to the selection of the backward command button 196, the web browser residing on the remote device 2 transmits the backward command to server 16 over network connection 8 (step 58). If a previously-viewed web page exists, the process 30 continues to step 76, discussed below with respect to FIG. 8. Otherwise, the process 30 continues to step 62 where the server 16 refreshes the current web page being viewed, after which the refreshed web page is displayed on the remote device 2 (step 64). The process 30 then returns to step 34, discussed previously above.

Figure 7:
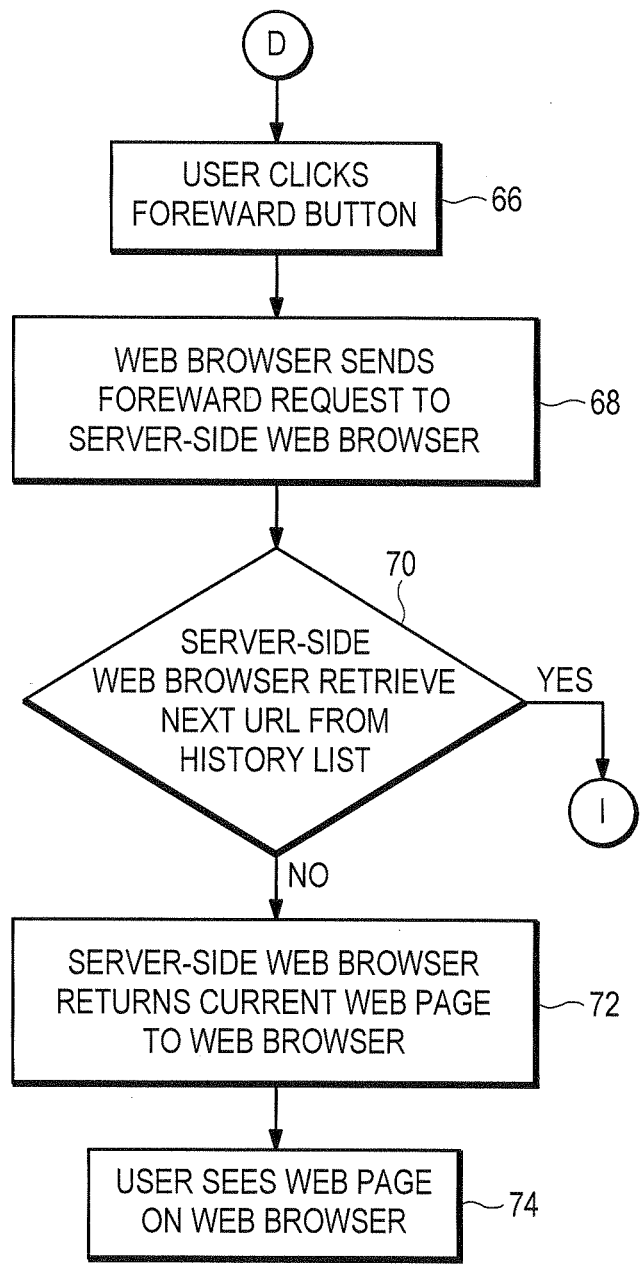

Referring now to FIG. 7, the process 30 may continue from step 34 to step 66 where the user may select the forward command button 198 in a desired lens. Similar to the forward command on a standard browser, the forward command of the system is a request to view a subsequent web page in a viewing history of the selected lens. In response to the selection of the forward command button 198, the web browser residing on the user's device 2 transmits the forward command to server 16 over network connection 8 (step 68). If a next web page exists, the process 30 continues to step 76, discussed below with respect to FIG. 8. Otherwise, the process 30 continues to step 72 where the server 16 refreshes the current web page being viewed, after which the refreshed web page is displayed on the user's device 2 (step 74). The process 30 then returns to step 34, discussed previously above.

Figure 8:
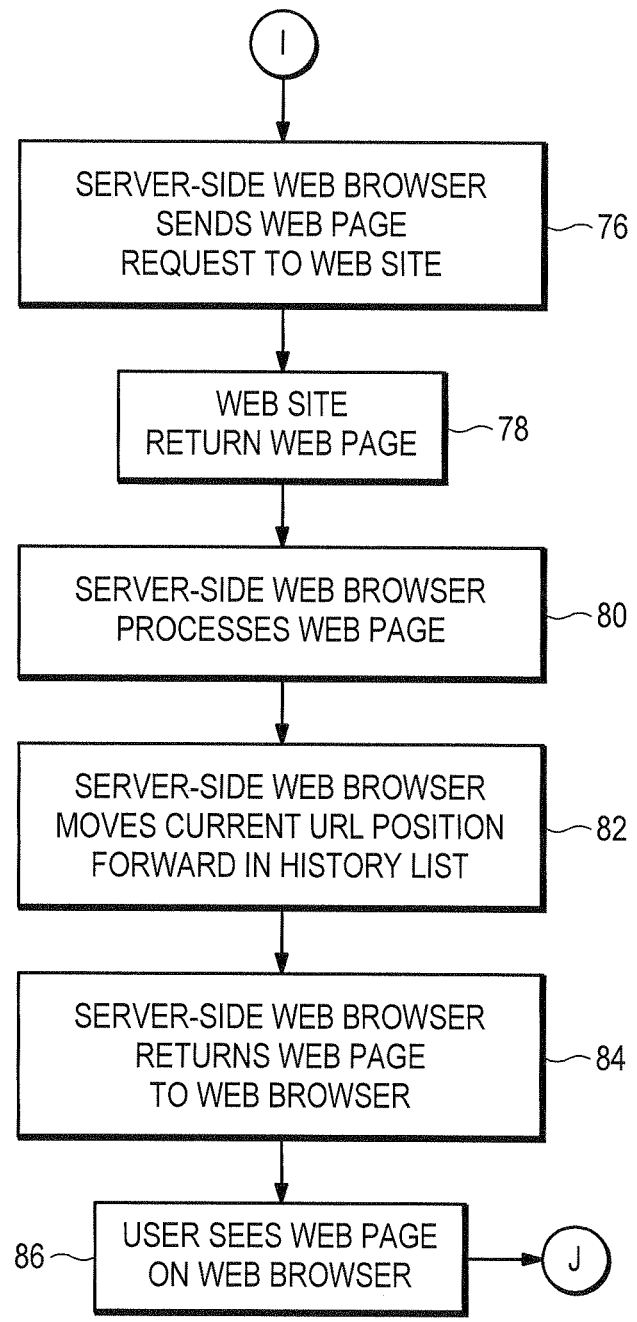

Referring now to FIG. 8, process 30 continues from either step 60 or 70 described above to step 76 where the server 16 transmits a request over network connection 8 to a third-party server (e.g. web server 10, 12, 14) which hosts the requested web page. In response, the third-party sever transmits web page data to the server 16 (step 78). The server 16 may then process the received data into a format suitable for transmission to the remote device 2 (step 80). The server 16 may further add the URL corresponding to the received data to the user's viewing history (step 82). The server 16 then transmits web page display data to the user including the formatted web page data (step 84) which is then displayed in the appropriate lens on user device 2 (step 86). The process 30 then returns to step 34 above.

In processing the web page display data received from a third party server, the host server can translate such data on the fly for presentation on a user device. For example, data received from a third party server may be in any form, including HTML, CSS, XML, XSL, XHTML or WML. The host server can translate such data into any other form, such as HTML or WML, for presentation on a user's device. As discussed further below, the host server can further reformat web page data received from a third party server on the fly.

Figure 9:
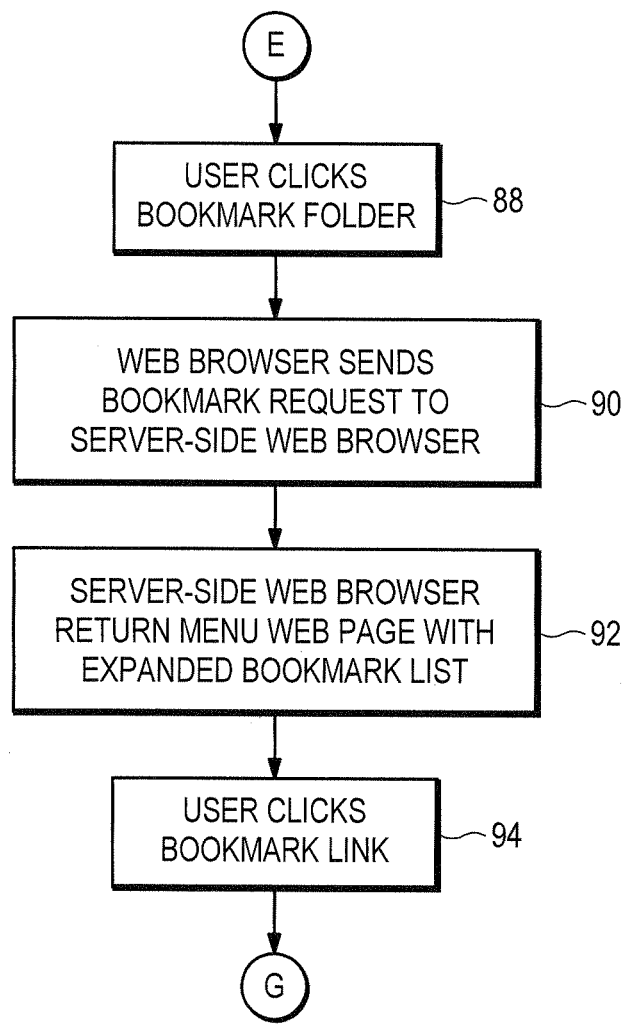

Turning to FIG. 9, process 30 may continue from step 40 described above to step 88, where the user selects the bookmark folder 172 from a menu web page 175 displayed in a lens 171. The browser on the remote device 2 then transmits a bookmark folder request over network connection 8 to server 16 (step 90). In response to the request, the server 16 generates a bookmark list page showing all the bookmarks stored for the user and transmits the data for display in the lens 171 on the user device 2 (step 92). The user may then choose one of the desired bookmarks (step 94) after which the process 30 continues to step 104, described below with respect to FIG. 11.

Figure 10:
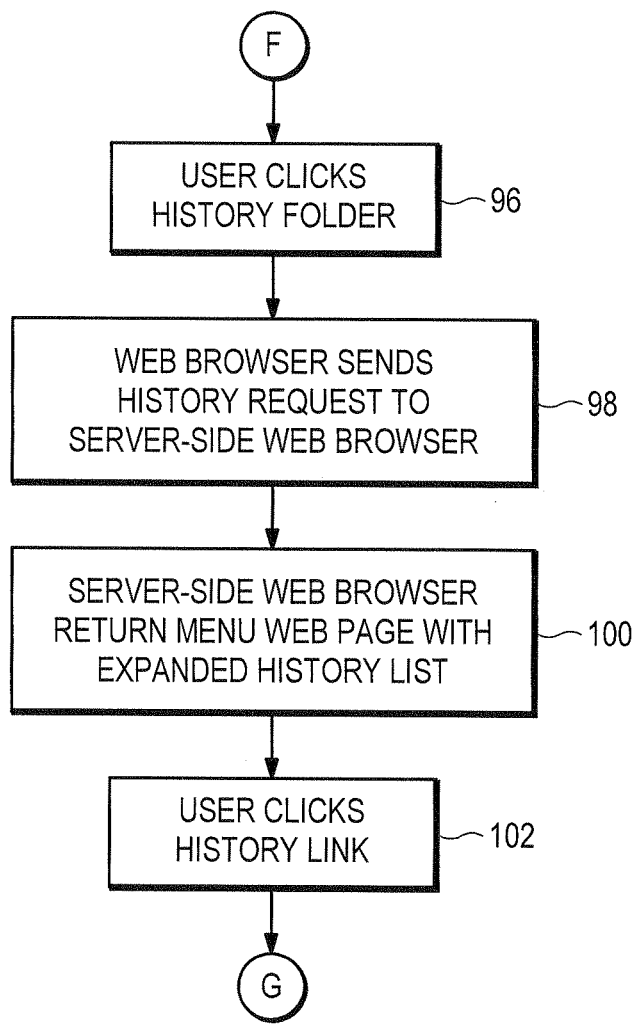

Referring now to FIG. 10, the process 30 may continue from step 40 to step 96 where the user may select the history folder 174 from the menu web page 175 displayed in the lens 171. The web browser residing on remote device 2 then transmits a request for viewing history data to server 16 over network connection 8 (step 98). The server 16 then generates a page displaying a predetermined number of web pages which the user has previously visited and transmits the same for display in the lens 171 of remote device 2 (step 100). The user may then select one of the web pages from the viewing history (step 102), after which the process 30 continues to step 104, discussed immediately below.

Figure 11:
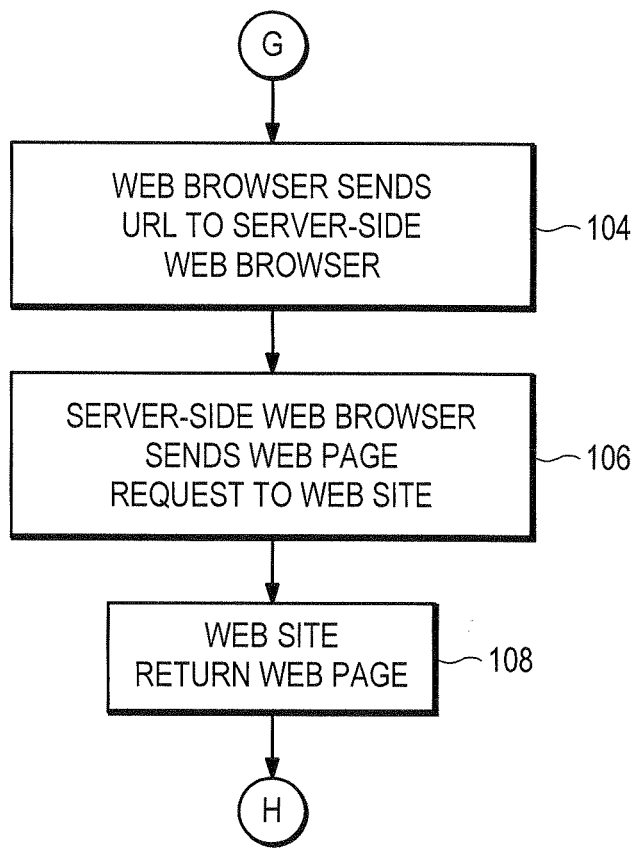

Referring now to FIG. 11, the process 30 may continue from any of steps 44, 94 or 102 described above to step 104 where the browser residing on the remote device 2 transmits a requested web page to the server 16 over network connection 8. The server 16, in turn, sends a request for the web page to the appropriate third-party server, e.g. web site server 10, over network connection 8 (step 106). The third-party server then transmits the requested web page data back to the server 16 (step 108), after which the process 30 continues to step 110, discussed immediately below.

Figure 12:
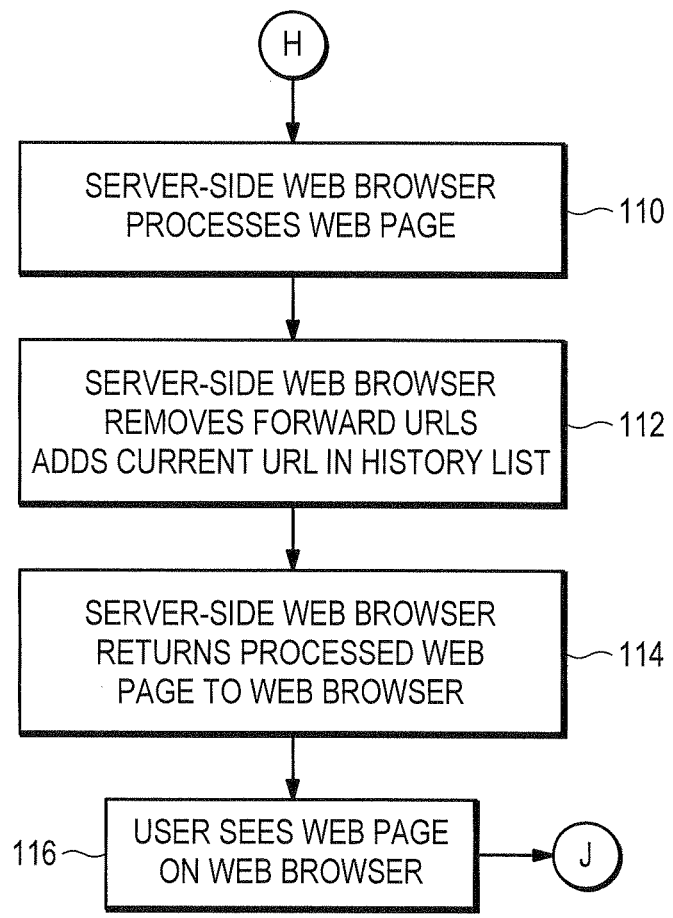

Turning now to FIG. 12, the process 30 continues to step 110 where the server 16 processes the received web page data to generate display data wherein the requested web page will be presented in the appropriate lens 171. The server 16 then adds the current URL to the most recent spot in the user's viewing history folder (step 112). Next, the server 16 transmits the generated display data to the remote device 2 over network connection 8 (step 118). Upon receipt, the web browser residing on the remote device 2 presents the multi-lens display to the user with the requested web page displayed in the appropriate lens 171 (step 116). The process 30 then returns to step 34, described above. Process 30 may continue until the user exits the browser, turns off the remote device 2, or otherwise halts communication with server 16.

Figure 13:
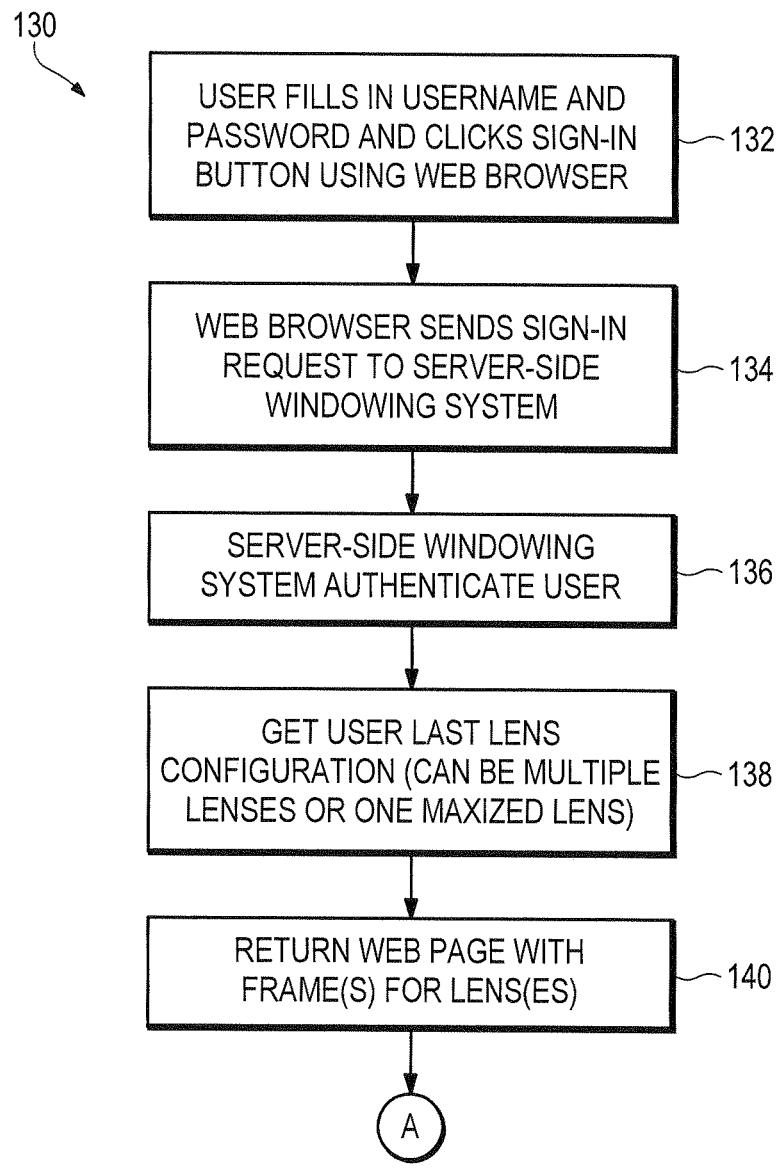
FIGS. 13-15 are a flowchart of an exemplary process by which a user may maximize or minimize a lens containing web page display data.

In addition to providing a user with the ability to view multiple web sites in a suitable number of lenses within a single browser window, and to navigate through different web sites using command buttons presented by a remote server 16, one embodiment allows a user to maximize a selected web page within the browser window. A process 131 for maximizing and minimizing one of a plurality of web pages within a single browser window is presented in FIGS. 13-15. Referring now to FIG. 13, the process 130 begins after a user enters a URL for a host server 16 in the URL entry line 163 of the browser residing on remote device 2 which, in turn, establishes a link to the server 16 via network connection 8. The server 16 first transmits a sign-in page, such as the one presented in window 160 of FIG. 16.

The user may fill in a user name and password in the appropriate fields 162 and 164, as well as affiliation information, if applicable, and selects the sign-in button 168 (step 132). The local browser then transmits the sign-in request to the server 16 over network connection 8 (step 134). Upon receipt, the server 16 matches the received sign-in information to valid, stored user sign in data, and authenticates the user if matching data is found (step 136). The server 16 may also retrieve the last web pages viewed by the user and generates display data including at least two frames which display the last web pages viewed (step 138). The display information is then transmitted over network connection 8 to the remote device 2 for display to the user (step 140). The display information may include HTML FRAME or IFRAME commands for generating the multiple lens display. The process 130 then continues to step 142, described immediately below.

Figure 14:
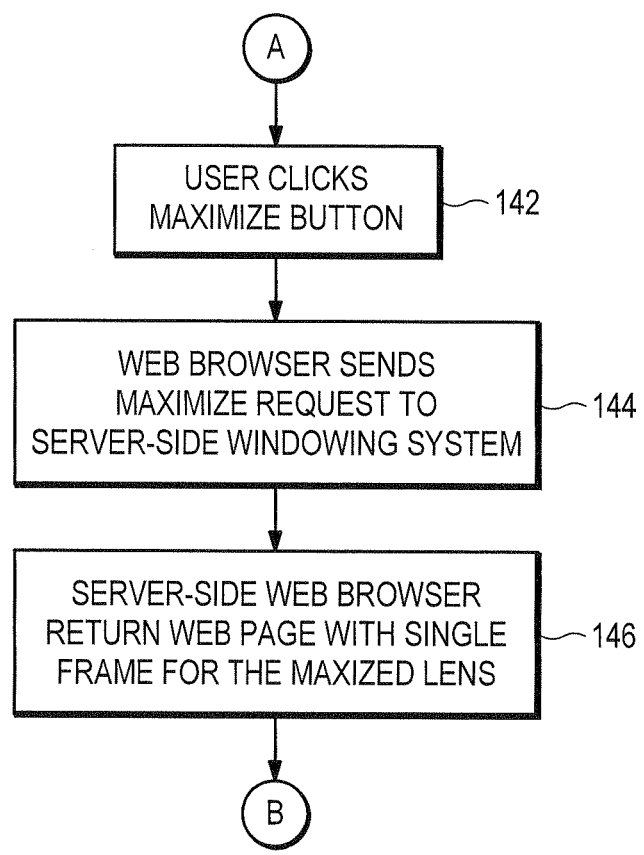

Turning now to FIG. 14, the process 130 continues to step 142 where the user may wish to view a maximized version of a web page displayed in one of the plurality of lenses 171, 173, 181, 183. To accomplish this, the user may select the maximize button 182 in the desired lens. The local browser then transmits the maximize request to the server 16 over network connection 8 (step 144). In response, server 16 generates new display data in which only the selected web page will be viewed within the browser window. The new display data is then transmitted to the remote device 2 over the network connection 8 (step 146). The resulting display may resemble the window 200 in FIG. 20. The process 130 then continues to step 148, discussed below.

Figure 15:
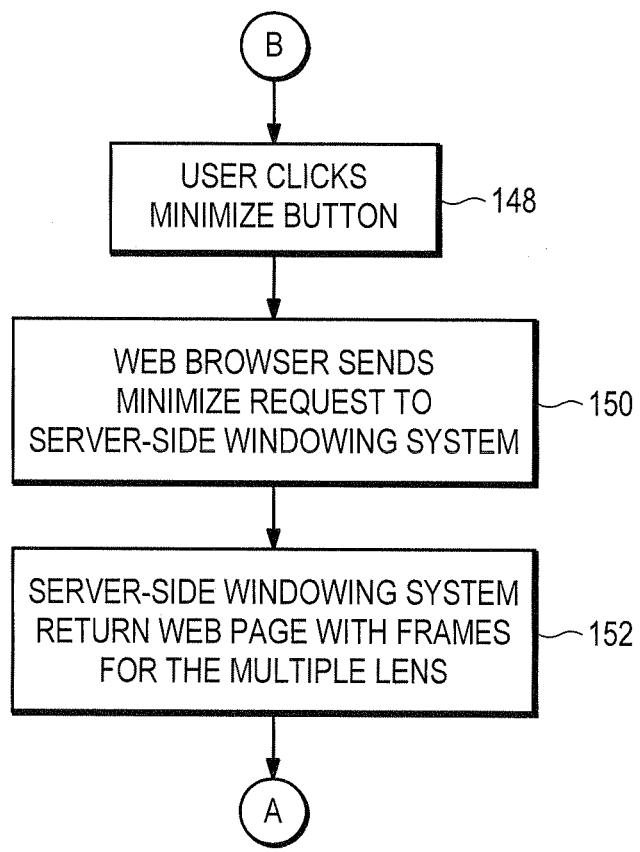

Turning now to FIG. 15, the process continues to step 148, where the user enters a command to minimize the web page.

Figure 20:
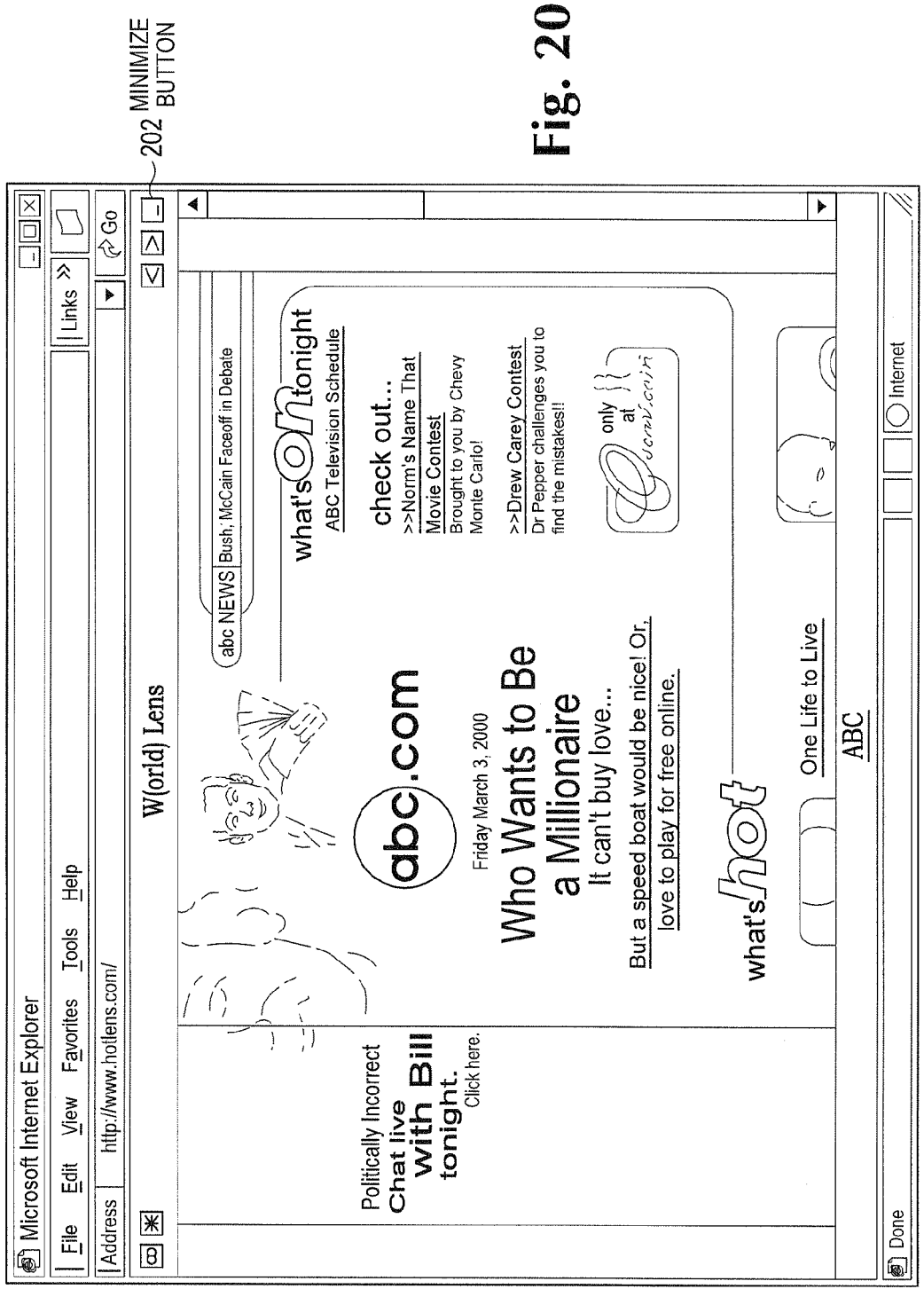
FIG. 20 is an exemplary screen display of a maximized lens.

This may be accomplished by selecting the minimize button 202 as displayed in FIG. 20. The local browser transmits the minimize request to the server 16 over the network connection 8 (step 5 150). The server 16 then generates new display data including the plurality of lenses with the formerly maximized web page presented in its original lens (step 152), after which the process 130 returns to step 142, described above. Process 130 may continue until the user exits the browser, turns off the remote device 2, or otherwise halts communication with server 16.

In another embodiment, it is possible for the server to store multiple cookies for each lens of the user's display. Cookies refer to files transmitted by third-party servers 10, 12, 14 and which are typically stored in memory 22 of a remote device 2. The cookies may serve to identify the user to the third-party server. Rather than storing cookies on the remote device 2, the server 16 may store the cookies in the server's memory 22 and associate the same with the particular user. Cookies may be further designated as belonging to a particular lens of the user's multiple lens display rather to the user in general.

In still another embodiment, the display information may be configured by the server 16 so that substantially all the content of a selected web page may be reformatted to fit within the display area of a lens or browser window. Typically, a web page contains more data than will fit within the display area of a window. In such a case, horizontal and vertical scroll bars 187, 185 are provided so that a user may view all the content of the web page. However, it may be desirable to allow the user to view the entire content at once. Accordingly, the system, method and apparatus allow the server to reformat the display information received from a third party server 10 so that substantially all the content of a web page can be presented within the display area of a lens or a local browser window. This may be accomplished by reducing the font size of the text of the web page, compressing pixel data associated with the web content, or in any other manner. The display data of a selected web page may be reformatted to present substantially all content of the web page within the display area of each lens, either automatically or in response to a user request. A user can request that the web page display data be reformatted to any percentage of its original size. Alternatively, the system can be utilized to increase the size of web page data so that it is substantially the same size as a larger display area.

The server-side web browsing and multiple lens system, method and apparatus enables dynamic miniaturized viewing of web pages. The system, method and apparatus is particularly suitable for thin-client technology where the viewing screen is on a small scale basis, such as in a multiple lens system described herein wherein the display area of each lens may be substantially smaller than the browser window, or in hand-held remote access wireless devices or PDA's.

Figure 21:
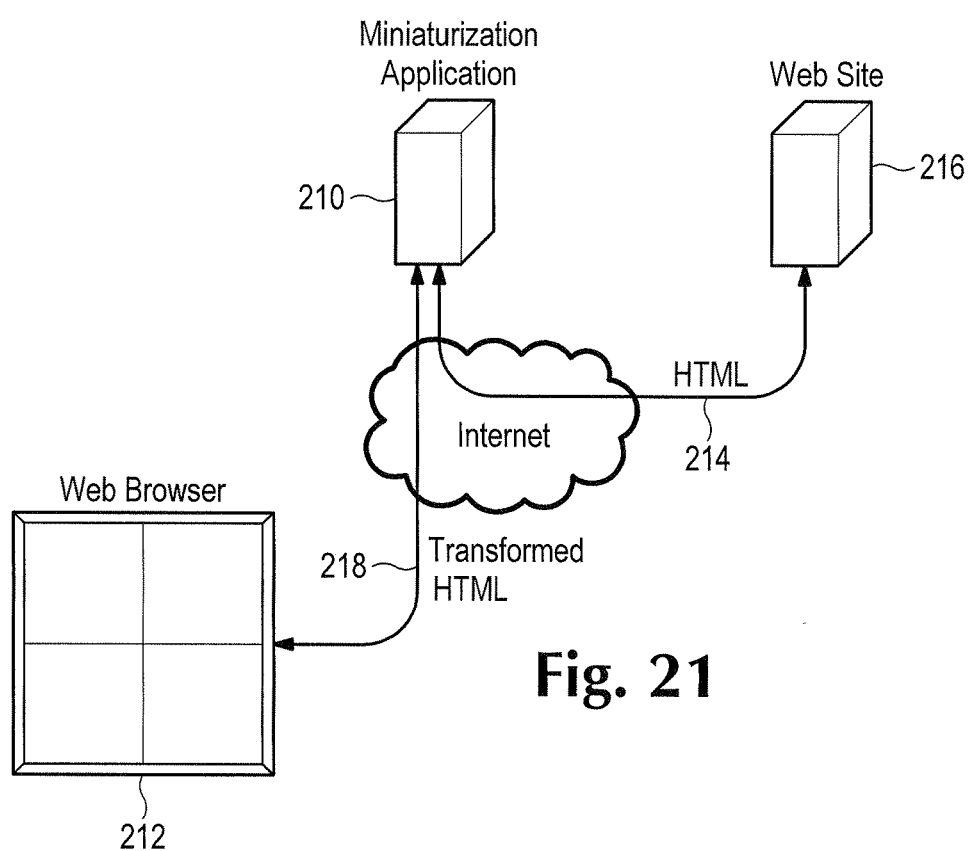
FIG. 21 is an exemplary network illustrating a dynamic miniaturization application.

FIG. 21 illustrates miniaturization application 210 as it is applied to a multiple lens display in web browser 212. To view a web page, a web browser sends a request with the appropriate URL to the system that in turn retrieves the HTML content 214 from the corresponding web site 216. The system applies the appropriate transformations to the HTML content before forwarding the reformatted or transformed HTML 218 to web browser 210. The transformations reduce the view size of the web content so that the web content can be easily viewed within a small size viewing area.

Figure 22:
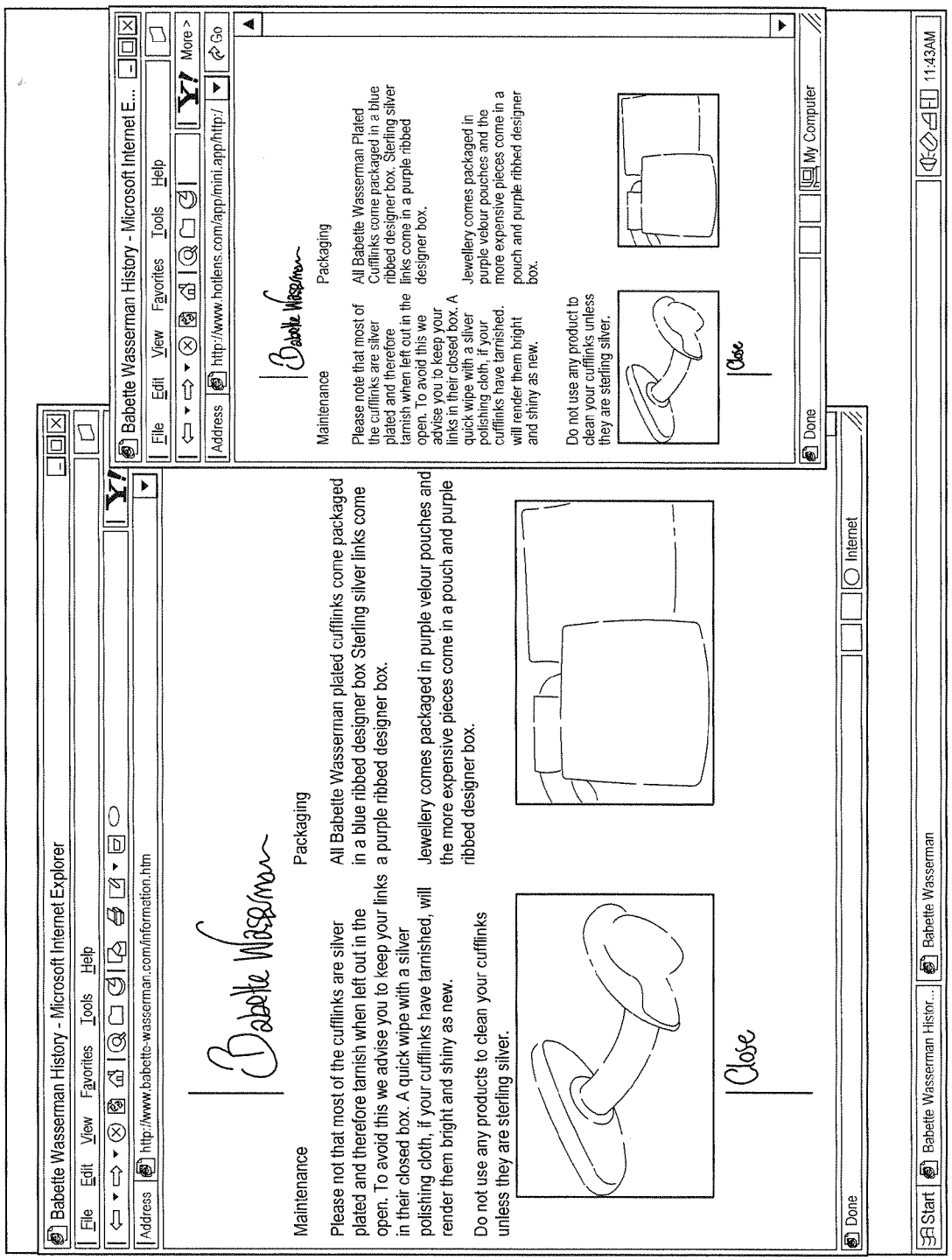
FIG. 22 is an exemplary illustration of a miniaturized web page to be presented within a display area of a lens or a browser window.

The system uses cascading style sheet technology to reduce the default text size of a web page. It also transforms the width, height and size attributes to HTML tags such as <table>, <td>, <img>, and <font>. In an exemplary illustration of the transformations, the system is programmed to reduce the view size by 50%. The system sets the default text size using cascading style sheet to 8 point size where the normal size is 12 point size. The system also reduces the width, height and size attributes of HTML tags such as <table>, <td>, <img>, and <font>, to half the original value. An example of a reformatted web page shown in its reduced size is illustrated in FIG. 22.

In an alternative embodiment, the system can be programmed to automatically reduce or enlarge the view size of a web page to any percentage of its original size, e.g., 50%, 75%, 125%, 150%, 200%. Alternatively, the system can reduce or enlarge the view size of a web page to any percentage selected by a user.

Although illustrative embodiments have been described herein in detail, it should be noted and understood that the descriptions have been provided for purposes of illustration only and that other variations both in form and detail can be made thereupon without departing from the spirit and scope of this invention. The terms and expressions have been used as terms of description and not terms of limitation. There is no limitation to use the terms or expressions to exclude any equivalents of features shown and described or portions thereof and this invention shown be defined with the claims that follow.

The invention claimed is:

1. An apparatus, comprising:
an electronic device configured to:
receive, over a network, a request for a first user session, the request originating from a first remote device;
wherein the first user session comprises a first remote web browser session;
prior to receiving the request for the first user session, detect an end of a second user session that is different than the first user session, wherein the second user session comprises a second remote web browser session that is different than the first remote web browser session, the second remote web browser session corresponding to a second remote device;
access a particular one of a plurality of records of a database responsive to detecting the end of the second user session, wherein the database comprises fields for storing user names, passwords, and a history of web pages viewed;
responsive to receiving the request for the first user session, recognize predetermined information included in the received request and, responsive to recognizing the predetermined information included in the request, match the request to the particular one of the records and use information added to said record at a time of said accessing to generate display information to correspond to a display user interface configuration of the end of the second user session, said display information for presentation within a window of a web browser on the first remote device;
transmit, over the network, said display information to the first remote device;
wherein the display information is based on received command data that includes a URL (uniform resource locator) having attributes comprising at least a port number and a command name-value pair, the received command data to implement a programming script to perform at least one of displaying a presentation lens associated with the web browser at a position in the window based on coordinates specified by the received command data, tiling the presentation lens and at least one other presentation lens associated with the web browser, or showing the presentation lens and the at least one other presentation lens in a horizontal row of the window.

2. The apparatus of claim 1, wherein the first remote device and the second remote device comprise different platforms.

3. The apparatus of claim 1, wherein the second remote device is different than the first remote device.

4. The apparatus of claim 1, wherein the electronic device is configured to:
responsive to detecting the end of the second user session, retain information about the display user interface configuration in non-volatile memory.

5. The apparatus of claim 1, wherein the presentation lenses are to be arranged according to an arrangement of a plurality of presentation lenses of a web browser used in the second user session.

6. The apparatus of claim 5, further comprising:
a memory configured to store a plurality of cookies,
wherein the electronic device is further configured to associate each cookie with a respective one of the plurality of records in the database, and to designate each cookie as belonging to a respective one of the plurality of presentation lenses of said web browser used in the second user session.

7. A method, comprising:
receiving, over a network, a request for a first user session, the request originating from a first remote device;
wherein the first user session comprises a first remote web browser session;
prior to receiving the request for the first user session, detecting an end of a second user session that is different than the first user session, wherein the second user session comprises a second remote web browser session that is different than the first remote web browser session, the second remote web browser session corresponding to a second remote device;
accessing a particular one of a plurality of records of a database responsive to detecting the end of the second user session, wherein the database comprises fields for storing user names, passwords, and a history of web pages viewed;
responsive to receiving the request for the first user session, matching the request to the particular one of the records and using information added to said record at a time of said accessing to generate display information configured for creating a plurality of presentation lenses to be displayed within a window of a web browser on the first remote device, wherein the plurality of presentation lenses is to be arranged according to the display information in a first display user interface configuration to correspond with a second display user interface configuration of the end of the second user session; and
transmitting, over the network, said display information to the first remote device;
wherein the display information is based on received command data that includes a URL (uniform resource locator) having attributes comprising at least a port number and a command name-value pair, the received command data to implement a programming script to perform at least one of displaying a presentation lens of the plurality of presentation lenses at a position in the window based on coordinates specified by the received command data, tiling the presentation lens and at least one other presentation lens of the plurality of presentation lenses, or showing the presentation lens and the at least one other presentation lens in a horizontal row of the window.

8. The method of claim 7, further comprising:
storing a plurality of cookies;
associating each cookie with a respective one of the plurality of records in the database; and
designating each cookie as belonging to a respective one of a plurality of presentation lenses of the associated record.

9. The method of claim 7, further comprising:
storing a plurality of histories of web pages visited;
associating each history with a respective one of the plurality of records in the database; and
designating each history as belonging to a respective one of a plurality of presentation lenses of the associated record.

10. The method of claim 7, further comprising:
wherein a first one of the lenses of the plurality of presentation lenses comprises a first display area and first navigation controls configured to control information displayed in the first display area; and
wherein a second one of the lenses of the plurality of presentation lenses comprises a second display area and second navigation controls configured to control information displayed in the second display area.

11. The method of claim 10, further comprising:
at a start of the first user session, displaying in the first display area a last web page visited in a corresponding presentation lens of the second user session.

12. The method of claim 11, wherein the electronic device is configured to:
at the start of the first user session, display in the second display area a last web page visited in a different corresponding presentation lens of the second user session.

13. The method of claim 7, wherein the first remote device and the second remote device comprise different platforms.

14. The method of claim 7, wherein the second remote device is different than the first remote device.

15. An electronic device, comprising:
means for associating user identifiers with stored display user interface configuration settings, wherein a first one of the stored display user interface configuration settings is different than a second one of the stored display user interface configuration settings;
means for matching a user identifier value included in a request for a first user session received over a network and originating from a first remote device to a particular one of the stored display user interface configuration settings that was accessed in response to detection of an end of a second user session that is different than the first user session;
wherein the first user session comprises a first remote web browser session and the second user session comprises a second remote web browser session that is different than the first remote web browser session, the second remote web browser session corresponding to a second remote device and associated with the user identifier value; and
means for generating, using information added to said particular one of the stored display user interface configuration settings at a time of said accessing, display information to be transmitted over the network and which is configured for creating a plurality of presentation lenses to be displayed within a window of a web browser on the first remote device, wherein the plurality of presentation lenses is to be arranged in a first display user interface configuration according to the display information to correspond with a second display user interface configuration of the end of the second user session;

wherein the display information is based on received command data that includes a URL (uniform resource locator) having attributes comprising at least a port number and a command name-value pair, the received command data to implement a programming script to perform at least one of displaying a presentation lens of the plurality of presentation lenses at a position in the window based on coordinates specified by the received command data, tiling the presentation lens and at least one other presentation lens of the plurality of presentation lenses, or showing the presentation lens and the at least one other presentation lens in a horizontal row of the window.

16. The electronic device of claim 15, further comprising:
means for storing a plurality of cookies; and
means for associating each cookie with a respective one of a plurality of presentation lenses of a respective one of the stored display user interface configuration settings.

17. The electronic device of claim 15, further comprising:
means for storing a plurality of histories of web pages visited; and
means for associating each history with a respective one of a plurality of presentation lenses of a respective one of the stored display user interface configuration settings.

18. The electronic device of claim 15, wherein the display information is configured to cause a different last web page to be displayed in each presentation lens of the plurality of presentation lenses.

19. The electronic device of claim 15, wherein the second remote device is different than the first remote device.

* * * * *